United States Patent
Lomayev et al.

(10) Patent No.: US 11,368,237 B2
(45) Date of Patent: *Jun. 21, 2022

(54) APPARATUS, SYSTEM AND METHOD OF COMMUNICATING A PPDU WITH GOLAY SEQUENCES

(71) Applicant: INTEL CORPORATION, Santa Clara, CA (US)

(72) Inventors: Artyom Lomayev, Nizhny Novgorod (RU); Iaroslav P. Gagiev, Nizhny Novgorod (RU); Alexander Maltsev, Nizhny Novgorod (RU); Michael Genossar, Modiin (IL); Carlos Cordeiro, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 89 days.

This patent is subject to a terminal disclaimer.

(21) Appl. No.: 16/879,792

(22) Filed: May 21, 2020

(65) Prior Publication Data
US 2020/0313786 A1 Oct. 1, 2020

Related U.S. Application Data

(63) Continuation of application No. 16/323,060, filed as application No. PCT/US2017/024913 on Mar. 30, 2017, now Pat. No. 10,693,583.
(Continued)

(51) Int. Cl.
*H04J 13/00* (2011.01)
*H04L 27/26* (2006.01)
(Continued)

(52) U.S. Cl.
CPC ........ *H04J 13/0014* (2013.01); *H04B 7/0413* (2013.01); *H04L 23/02* (2013.01);
(Continued)

(58) Field of Classification Search
CPC ....... H04J 13/0014; H04J 13/00; H04L 27/26; H04L 27/2613; H04L 25/0226;
(Continued)

(56) References Cited

U.S. PATENT DOCUMENTS 10,693,583 B2 * 6/2020 Lomayev ................ H04L 23/02
2009/0160707 A1 6/2009 Lakkis
(Continued)

OTHER PUBLICATIONS

International Search Report and the Written Opinion for International Application No. PCT/US2017/024913, dated Jul. 10, 2017, 11 pages.
(Continued)

*Primary Examiner* — Brenda H Pham
(74) *Attorney, Agent, or Firm* — Shichrur & Co.

(57) ABSTRACT

Some demonstrative embodiments include apparatuses, devices, systems and methods of communicating a channel estimation field with Golay Sequences. For example, an apparatus may include logic and circuitry configured to cause a wireless station to determine a first sequence having a length of 1536 based on a first combination of a pair of Golay sequences, each Golay sequence of the pair of Golay sequences having a length of 384; to determine a second sequence having a length of 1536 based on a second combination of the pair of Golay sequences; and to transmit an Enhanced Directional Multi-Gigabit (EDMG) Physical Layer Convergence Protocol (PLCP) Protocol Data Unit (PPDU) over a channel in a frequency band above 45 Ghz, the EDMG PPDU including an EDMG Channel Estimation Field (CEF) including the first sequence followed by the second sequence, the channel having a channel bandwidth of 6.48 GHz or an integer multiple of 6.48 GHz.

25 Claims, 7 Drawing Sheets

Related U.S. Application Data

(60) Provisional application No. 62/376,536, filed on Aug. 18, 2016.

(51) Int. Cl.
*H04L 25/02* (2006.01)
*H04L 23/02* (2006.01)
*H04B 7/0413* (2017.01)
*H04W 80/08* (2009.01)
*H04L 5/00* (2006.01)

(52) U.S. Cl.
CPC .......... *H04L 25/0226* (2013.01); *H04L 27/26* (2013.01); *H04L 27/2602* (2013.01); *H04L 27/2613* (2013.01); *H04W 80/08* (2013.01); *H04J 13/00* (2013.01); *H04L 5/0007* (2013.01)

(58) Field of Classification Search
CPC ... H04L 23/02; H04L 27/2602; H04L 5/0007; H04B 7/0413; H04W 80/08
See application file for complete search history.

(56) References Cited

U.S. PATENT DOCUMENTS

| | | |
|---|---|---|
| 2009/0209206 A1 | 8/2009 | Zou et al. |
| 2014/0369213 A1 | 12/2014 | Kim et al. |
| 2016/0164800 A1 | 6/2016 | Eitan et al. |
| 2016/0218890 A1 | 7/2016 | Sanderovich |
| 2017/0070995 A1 | 3/2017 | Eitan et al. |
| 2017/0324599 A1 | 11/2017 | Lomayev et al. |
| 2019/0190637 A1 | 6/2019 | Lomayev et al. |

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
IEEE Std 802.11ad™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.
International Preliminary Report on Patentability for International Application No. PCT/US2017/024913, dated Feb. 28, 2019, 7 pages.
Notice of Allowance for U.S. Appl. No. 16/323,060, dated Feb. 12, 2020, 19 Pages.

* cited by examiner

APPARATUS, SYSTEM AND METHOD OF COMMUNICATING A PPDU WITH GOLAY SEQUENCES

CROSS REFERENCE

This application claims the benefit of and priority from US Provisional Patent Application No. 62/376,536 entitled "APPARATUS, SYSTEM AND METHOD OF COMMUNICATING A CHANNEL ESTIMATION FIELD WITH GOLAY SEQUENCES", filed Aug. 18, 2016, the entire disclosure of which is incorporated herein by reference.

TECHNICAL FIELD

Embodiments described herein generally relate to communicating a channel estimation field with Golay Sequences.

BACKGROUND

A wireless communication network in a millimeter-wave band may provide high-speed data access for users of wireless communication devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements.

The figures are listed below.

DETAILED DESCRIPTION

Figure 1:
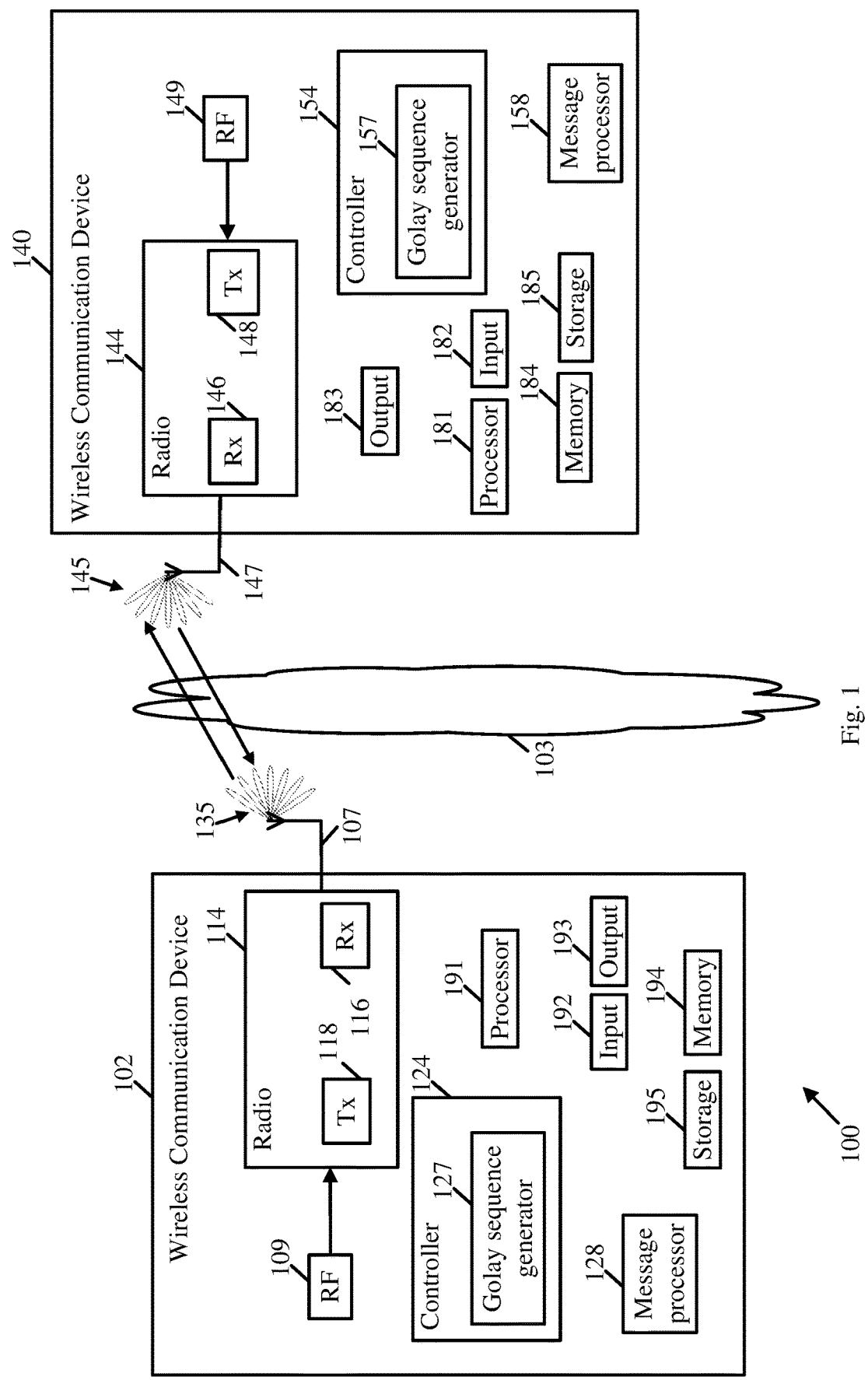
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (*IEEE 802.11-2016, IEEE Standard for Information technology—Telecommunications and information exchange between systems Local and metropolitan area networks—Specific requirements Part* 11*: Wireless LAN Medium Access Control (MAC) and Physical Layer (PHY) Specifications*, Dec. 7, 2016); IEEE 802.11ay (*P802.11ay Standard for Information Technology—Telecommunications and Information Exchange Between Systems Local and Metropolitan Area Networks—Specific Requirements Part* 11*: Wireless LAN Medium Access Control (MAC) and Physical Layer (PHY) Specifications—Amendment: Enhanced Throughput for Operation in License-Exempt Bands Above* 45 *GHz*))

and/or future versions and/or derivatives thereof, devices and/or networks operating in accordance with existing WiFi Alliance (WFA) Peer-to-Peer (P2P) specifications (including *WiFi P2P technical specification, version* 1.5, Aug. 4, 2015) and/or future versions and/or derivatives thereof, devices and/or networks operating in accordance with existing Wireless-Gigabit-Alliance (WGA) specifications (including *Wireless Gigabit Alliance, Inc WiGig MAC and PHY Specification Version* 1.1, April 2011, *Final specification*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like.

Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band above 45 GHz, e.g., 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHz, a frequency band above 45 GHz, a frequency band below 20 GHz, e.g., a Sub 1 GHz (S1G) band, a 2.4 GHz band, a 5 GHz band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., at least 7 Gigabit per second, at least 30 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, and/or one more other devices.

In some demonstrative embodiments, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG channels. In other embodiments WM 103 may include any other directional channels.

In other embodiments, WM 103 may include any other type of channel over any other frequency band.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, an mmWave band, and/or any other band, for example, a 2.4 GHz band, a 5 GHz band, a S1G band, and/or any other band.

In some demonstrative embodiments, radios 114 and/or 144 may include, or may be associated with one or more, e.g., a plurality of, directional antennas.

In some demonstrative embodiments, device 102 may include one or more, e.g., a plurality of, directional antennas 107, and/or device 140 may include on or more, e.g., a plurality of, directional antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include directional antennas, which may be steered to one or more beam directions. For example, antennas 107 may be steered to one or more beam directions 135, and/or antennas 147 may be steered to one or more beam directions 145.

In some demonstrative embodiments, antennas 107 and/or 147 may include and/or may be implemented as part of a single Phased Antenna Array (PAA).

In some demonstrative embodiments, antennas 107 and/or 147 may be implemented as part of a plurality of PAAs, for example, as a plurality of physically independent PAAs.

In some demonstrative embodiments, a PAA may include, for example, a rectangular geometry, e.g., including an integer number, denoted M, of rows, and an integer number, denoted N, of columns. In other embodiments, any other types of antennas and/or antenna arrays may be used.

In some demonstrative embodiments, antennas 107 and/or antennas 147 may be connected to, and/or associated with, one or more Radio Frequency (RF) chains.

In some demonstrative embodiments, device 102 may include one or more, e.g., a plurality of, RF chains 109 connected to, and/or associated with, antennas 107.

In some demonstrative embodiments, one or more of RF chains 109 may be included as part of, and/or implemented as part of one or more elements of radio 114, e.g., as part of transmitter 118 and/or receiver 116.

In some demonstrative embodiments, device 140 may include one or more, e.g., a plurality of, RF chains 149 connected to, and/or associated with, antennas 147.

In some demonstrative embodiments, one or more of RF chains 149 may be included as part of, and/or implemented as part of one or more elements of radio 144, e.g., as part of transmitter 148 and/or receiver 146.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, device 102 and/or device 140 may include, operate as, perform the role of, and/or perform one or more functionalities of, one or more STAs. For example, device 102 may include at least one STA, and/or device 140 may include at least one STA.

In some demonstrative embodiments, device 102 and/or device 140 may include, operate as, perform the role of, and/or perform one or more functionalities of, one or more DMG STAs. For example, device 102 may include, operate as, perform the role of, and/or perform one or more functionalities of, at least one DMG STA, and/or device 140 may include, operate as, perform the role of, and/or perform one or more functionalities of, at least one DMG STA.

In other embodiments, devices 102 and/or 140 may include, operate as, perform the role of, and/or perform one or more functionalities of, any other wireless device and/or station, e.g., a WLAN STA, a WiFi STA, and the like.

In some demonstrative embodiments, device 102 and/or device 140 may be configured operate as, perform the role of, and/or perform one or more functionalities of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102 and/or device 140 may be configured to operate as, perform the role of, and/or perform one or more functionalities of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102 and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments devices 102 and/or 140 may be configured to communicate over a Next Generation 60 GHz (NG60) network, an Enhanced DMG (EDMG) network, and/or any other network. For example, devices 102 and/or 140 may perform Multiple-Input-Multiple-Output (MIMO) communication, for example, for communicating over the NG60 and/or EDMG networks, e.g., over an NG60 or an EDMG frequency band.

In some demonstrative embodiments, devices 102 and/or 140 may be configured to operate in accordance with one or more Specifications, for example, including, one or more IEEE 802.11 Specifications, e.g., an IEEE 802.11-2016 Specification, an IEEE 802.11ay Specification, and/or any other specification and/or protocol.

Some demonstrative embodiments may be implemented, for example, as part of a new standard in an mmWave band, e.g., a 60 GHz frequency band or any other directional band, for example, as an evolution of an IEEE 802.11-2016 Specification and/or an IEEE 802.11ad Specification.

In some demonstrative embodiments, devices 102 and/or 140 may be configured according to one or more standards, for example, in accordance with an IEEE 802.11ay Standard, which may be, for example, configured to enhance the efficiency and/or performance of an IEEE 802.11ad Specification, which may be configured to provide Wi-Fi connectivity in a 60 GHz band.

Some demonstrative embodiments may enable, for example, to significantly increase the data transmission rates defined in the IEEE 802.11ad Specification, for example, from 7 Gigabit per second (Gbps), e.g., up to 30 Gbps, or to any other data rate, which may, for example, satisfy growing demand in network capacity for new coming applications.

Some demonstrative embodiments may be implemented, for example, to allow increasing a transmission data rate, for example, by applying MIMO and/or channel bonding techniques.

In some demonstrative embodiments, devices 102 and/or 140 may be configured to communicate MIMO communications over the mmWave wireless communication band.

In some demonstrative embodiments, device 102 and/or device 140 may be configured to support one or more mechanisms and/or features, for example, channel bonding, Single User (SU) MIMO, and/or Multi-User (MU) MIMO, for example, in accordance with an IEEE 802.11ay Standard and/or any other standard and/or protocol.

In some demonstrative embodiments, device 102 and/or device 140 may include, operate as, perform a role of, and/or perform the functionality of, one or more EDMG STAs. For example, device 102 may include, operate as, perform a role of, and/or perform the functionality of, at least one EDMG STA, and/or device 140 may include, operate as, perform a role of, and/or perform the functionality of, at least one EDMG STA.

In some demonstrative embodiments, devices 102 and/or 140 may implement a communication scheme, which may include Physical layer (PHY) and/or Media Access Control (MAC) layer schemes, for example, to support one or more applications, and/or increased transmission data rates, e.g., data rates of up to 30 Gbps, or any other data rate.

In some demonstrative embodiments, the PHY and/or MAC layer schemes may be configured to support frequency channel bonding over a mmWave band, e.g., over a 60 GHz band, SU MIMO techniques, and/or MU MIMO techniques.

In some demonstrative embodiments, devices 102 and/or 140 may be configured to implement one or more mechanisms, which may be configured to enable SU and/or MU communication of Downlink (DL) and/or Uplink frames (UL) using a MIMO scheme.

In some demonstrative embodiments, device 102 and/or device 140 may be configured to implement one or more MU communication mechanisms. For example, devices 102 and/or 140 may be configured to implement one or more MU mechanisms, which may be configured to enable MU communication of DL frames using a MIMO scheme, for example, between a device, e.g., device 102, and a plurality of devices, e.g., including device 140 and/or one or more other devices.

In some demonstrative embodiments, devices 102 and/or 140 may be configured to communicate over an NG60 network, an EDMG network, and/or any other network and/or any other frequency band. For example, devices 102 and/or 140 may be configured to communicate DL MIMO transmissions and/or UL MIMO transmissions, for example, for communicating over the NG60 and/or EDMG networks.

Some wireless communication Specifications, for example, the IEEE 802.11ad-2012 Specification, may be configured to support a SU system, in which a STA may transmit frames to a single STA at a time. Such Specifications may not be able, for example, to support a STA transmitting to multiple STAs simultaneously, for example, using a MU-MIMO scheme, e.g., a DL MU-MIMO, or any other MU scheme.

In some demonstrative embodiments, devices 102 and/or 140 may be configured to implement one or more mechanisms, which may, for example, enable to extend a single-channel BW scheme, e.g., a scheme in accordance with the IEEE 802.11ad Specification or any other scheme, for higher data rates and/or increased capabilities, e.g., as described below.

In some demonstrative embodiments, devices 102 and/or 140 may be configured to implement one or more channel bonding mechanisms, which may, for example, support communication over bonded channels.

In some demonstrative embodiments, the channel bonding mechanisms may include, for example, a mechanism and/or an operation whereby two or more channels can be combined, e.g., for a higher bandwidth of packet transmission, for example, to enable achieving higher data rates, e.g., when compared to transmissions over a single channel. Some demonstrative embodiments are described herein with respect to communication over a bonded channel, however other embodiments may be implemented with respect to communications over a channel bandwidth, e.g., a "wide" channel (also referred to as an "EDMG channel", a "wide channel", or a "bonded channel"), including or formed by two or more channels, for example, an aggregated channel including an aggregation of two or more channels.

In some demonstrative embodiments, device 102 and/or device 140 may be configured to implement one or more channel bonding mechanisms, which may, for example, support an increased channel bandwidth, for example, a channel BW of 4.32 GHz, e.g., including two 2.16 Ghz channels according to a channel bonding factor of two, a channel BW of 6.48 GHz, e.g., including three 2.16 Ghz channels according to a channel bonding factor of three, a channel BW of 8.64 GHz, e.g., including four 2.16 Ghz channels according to a channel bonding factor of four, and/or any other additional or alternative channel BW, e.g., including any other number of 2.16 Ghz channels and/or according to any other channel bonding factor.

In some demonstrative embodiments, devices 102 and/or 140 may be configured to communicate using a frame structure, which may be configured, for example, for a Single Carrier (SC) Physical layer (PHY) modulation, for example, with frequency domain equalization, e.g., as described below.

Some communication schemes, for example, in accordance with an *IEEE 802.11ad Specification*, may implement first and second Golay complementary sequences, e.g., the sequences Ga and Gb, to define a Short Training Field (STF) and a Channel Estimation Field (CEF) of a packet preamble. For example, the STF field may be configured to be used by a receiver of a packet, e.g., device 140, for packet detection, carrier frequency offset estimation, noise power estimation, synchronization, Automatic Gain Control (AGC) setup, and/or one or more other additional or alternative signal estimations. For example, the CEF may be configured to be used by the receiver of the packet for channel estimation, e.g., in a time domain and/or a frequency domain.

In some demonstrative embodiments, devices 102 and/or 140 may be configured to generate, transmit, receive, and/or process one or more transmissions, for example EDMG transmissions, e.g., including EDMG packets, which may include one or more fields, for example, an EDMG STF (EDMG-STF) and/or an EDMG CEF (EDMG-CEF), which may utilize one or more extensions of Golay sequences, for example, extensions of the Golay sequences Ga and/or Gb, e.g., as described below.

In some demonstrative embodiments, devices 102 and/or 140 may be configured to communicate over one or more channels having one or more channel BWs. For example, devices 102 and/or 140 may be configured to communicate over a channel having a channel BW of 2.16 GHz, a channel having a channel BW of 4.32 GHz, a channel having a channel BW of 6.48 GHz, a channel having a channel BW of 8.64 GHz, and/or any other additional or alternative channel BW.

In some demonstrative embodiments, devices 102 and/or 140 may be configured to communicate according to a channel bonding mechanism. For example, during channel bonding transmission a station (STA) may occupy a single channel, e.g., corresponding to a single channel transmission, or a plurality of channels, for example, 1, 2, 3 or 4 frequency channels, e.g., corresponding to channel bonding of 2, 3, or 4 channels. For example, a Channel Bonding (CB) value may indicate a number of frequency channels, e.g., CB=1, 2, 3, 4 or any other value.

For example, the value CB=1 may correspond to a channel having a channel BW of 2.16 GHz, the value CB=2 may correspond to a channel having a channel BW of 4.32 GHz, the value CB=3 may correspond to a channel having a channel BW of 6.48 GHz, and/or the value CB=4 may correspond to a channel having a channel BW of 8.64 GHz In some demonstrative embodiments, an EDMG Channel Estimation Field (CEF) may be configured to support SISO and/or MIMO transmission over a channel BW including a plurality of 2.16 GHz channels, e.g., with channel bonding. For example, for Single Carrier (SC) PHY, e.g., in case of CB=1, 2, and/or 4, for both Single Input Single Output (SISO) and Multiple Input Multiple Output (MIMO) transmission, the CEF may be configured to use the complementary pair of Golay sequences (Ga, Gb) in its definition allowing simple channel estimation in time and frequency domain.

In some demonstrative embodiments, for example, the length of the sequence for single channel transmission may be equal to 128 chips. For example, for the case of CB=2 and/or CB=4 the length of Golay sequences may be increased, for example, to 256 and/or 512, respectively. This configuration of the Golay sequences may allow, for example, keeping the same time duration as in the single channel transmission, and/or keeping the same resolution in the frequency domain.

In some demonstrative embodiments, for example, in case of a MIMO transmission, the pair of Golay sequences of length N, denoted ($Ga_N$, $Gb_N$), may be replaced with a Golay Sequence Set (GSS), which may include, for example, $N_{STS}$ pairs ($Ga^i_N$, $Gb^i_N$), wherein i=1:$N_{STS}$, and wherein $N_{STS}$ denotes a number, e.g., maximum number, of space-time streams, e.g., as described below.

In some demonstrative embodiments, the Golay sequences may be included in a CEF having a CEF structure, which may be configured for EDMG transmissions, e.g., over an EDMG channel.

In some demonstrative embodiments, devices 102 and/or 140 may be configured to utilize a CEF structure and/or Golay sequences, which may be configured to support, for example, at least a transmission over a channel having a channel bandwidth of 6.48 GHz or an integer multiple of 6.48 GHz, e.g., as described below.

For example, the channel having the channel bandwidth of 6.48 GHz may correspond to a channel including three 2.16 GHz channels, e.g., a channel having a channel bonding of 3 frequency channels (CB=3).

For example, devices 102 and/or 140 may be configured to utilize the CEF structure and/or Golay sequences, which may be configured to support, for example, at least the transmission with CB=3, for example, a SISO transmission with CB=3, and/or or a MIMO transmission with CB=3, e.g., as described below.

In some demonstrative embodiments, Golay sequences having a sequence length of N=384 and/or N=256 may be used. In some demonstrative embodiments, the Golay sequences may be configured to meet one or more design requirements and/or design rules for an EDMG transmission, and/or comply with a CEF structure for EDMG transmission, e.g., as described below.

In some demonstrative embodiments, devices 102 and/or 140 may be configured to generate, transmit, receive and/or process one or more transmissions over a directional frequency band, e.g., EDMG transmissions, using one or more Golay sequences, and/or a CEF, e.g., an EDMG CEF, which may be configured to support, at least a channel having at least a channel bandwidth of 6.48 GHz or an integer multiple of 6.48 GHz, for example, the channel having a channel bonding of an integer multiple of 3 frequency channels (CB=3), e.g., as described below.

In some demonstrative embodiments, devices 102 and/or 140 may be configured to generate, transmit, receive and/or process one or more transmissions, e.g., SISO and/or MIMO transmissions, over a directional frequency band, e.g., EDMG transmissions, for example, with a channel bonding of at least CB=3, for example, using at least one pair of Golay sequences (Ga384, Gb384) of a length of 384 samples (chips), e.g., as described below.

In some demonstrative embodiments, devices 102 and/or 140 may be configured to generate, transmit, receive and/or process one or more transmissions, e.g., SISO and/or MIMO transmissions, over a directional frequency band, e.g., EDMG transmissions, for example, with a channel bonding of CB=3, for example, using at least one pair of Golay sequences (Ga256, Gb256) of a length of 256 samples, e.g., as described below.

In some demonstrative embodiments, a solution for performing an EDMG transmission over a channel bandwidth of 6.48 GHz, e.g., the channel having the channel bonding of 3 frequency channels (CB=3), which allows channel estimation to be performed in time domain only may not be efficient and/or may not be possible for implementations in some use cases and/or deployments.

In some demonstrative embodiments, devices 102 and/or 140 may be configured to generate, transmit, receive and/or process one or more transmissions, e.g., SISO and/or MIMO transmissions, over a directional frequency band, e.g., EDMG transmissions, for example, according to a mechanism utilizing Golay sequences and/or a CEF structure, e.g., described below, which, for example, may even be able to support channel estimation in both time and frequency domains.

In some demonstrative embodiments, the mechanism utilizing Golay sequences and/or a CEF structure, e.g., described below, may be compatible with a DMG-CEF structure, e.g., as defined by an *IEEE* 802.11*ad Specification*.

In some demonstrative embodiments, the CEF structure may be configured, for example, to utilize a plurality of repetitions, e.g., 4 repetitions or any other number of repetitions, of Ga/Gb sequences, e.g., as described below.

In some demonstrative embodiments, a CEF structure may be configured based on a Golay sequence of a length of 384, e.g., as described below.

In some demonstrative embodiments, the CEF structure utilizing Golay sequences of the length 384 may be configured to be compatible, for example, at least with a structure of CEF utilizing Golay sequences of a length of 128, for example, a DMG-CEF for SISO, e.g., in accordance with an *IEEE* 802.11*ad Specification*.

Figure 2:
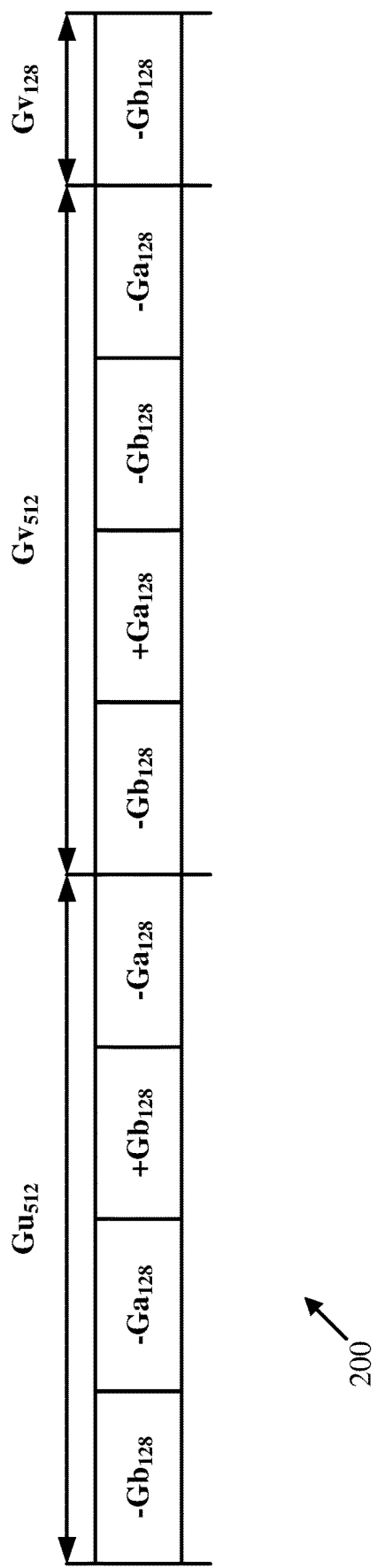
FIG. 2 is a schematic illustration of a Channel Estimation Field (CEF) including Golay sequences with a length of 128.

Reference is now to FIG. 2, which schematically illustrates of a CEF 200 including Golay sequences with a length of 128. For example, CEF 200 may include a DMG-CEF channel estimation field design for a SISO system.

As shown in FIG. 2, CEF 200 may be defined using a bipolar complementary Golay pair (Ga128, Gb128) of a length of 128 chips. The Golay sequences Ga128 and Gb128 are defined at the 1.76 GHz chip rate. The Golay sequences Ga128 and Gb128 may be multiplied by the exponent $\exp(j(\pi/2)*n)$, for example, to create $\pi/2$-BPSK modulated symbols, e.g., as follows:

$$Ga128(n)*\exp(j(\pi/2)*n), n=0,1,\ldots,127$$

$$Gb128(n)*\exp(j(\pi/2)*n), n=0,1,\ldots,127$$

This configuration may exploit a property that the sum of autocorrelation functions for the sequences Ga and Gb is equal to a delta function, e.g., as follows:

$$Ga(-n)\otimes Ga(n)+Gb(-n)\otimes Gb(n)=\delta(n) \quad (1)$$

wherein the symbol $\otimes$ denotes circular convolution, and the index $(-n)$ denotes an inverse order of samples in a corresponding Golay sequence, e.g., Ga or Gb.

Based on this property, for example, a channel impulse response, denoted h(n), may be estimated, e.g., as follows:

$$Ga(-n)\otimes h(n)\otimes Ga(n)+Gb(-n)\otimes h(n)\otimes Gb(n)=h(n)\otimes\delta(n)=h(n) \quad (2)$$

The first sequence (−Gb128) in FIG. 2 may represent a Guard Interval (GI), which may be configured to guarantee a circular convolution property. As shown in FIG. 2, this GI sequence may be followed by 4 repetitions of the sequences Ga/Gb following each other in time. As shown in FIG. 2, the 8 sequences may be combined into two sequences, Gu512 and Gv512, each of a size of 512 samples. The signs of the sequences in FIG. 2 may be selected, for example, such that the sequences Gu512 and Gv512 are also complementary sequences. As shown in FIG. 2, the sequences Gu512 and Gv512 may be appended with a repetition of the sequence −Gb128, e.g., at the end of CEF 200.

For example, this design of CEF 200 may allow channel estimation in a time domain, e.g., according to Equations 1 and/or 2, as well as in a frequency domain, for example, by taking Discrete Fourier Transform (DFT) of the sequences Gv and Gu, and performing matched filtering and summation.

For example, the Fourier transform of the Gu and Gv sequences may be denoted as follows:

$$U=\text{DFT}(Gu)$$

$$V=\text{DFT}(Gv) \quad (3)$$

Accordingly, the channel estimation may be determined, e.g., as follows:

$$\hat{H}=H\cdot U\cdot U^*+H\cdot V\cdot V^*=H$$

$$U\cdot U^*+V\cdot V^*=1 \quad (4)$$

wherein $U^*$ and $V^*$ denote matched filter solutions in the frequency domain, multiplication is performed element wise, and an index inside each of the vectors H, U, or V defines a subcarrier index.

Referring back to FIG. 1, in some demonstrative embodiments, devices 102 and/or 140 may be configured to generate, transmit, receive and/or process a transmission using a CEF, e.g., an EDMG-CEF field, which may be configured to support, for example, at least a transmission, e.g., a SISO transmission or a MIMO transmission, using at least 3 channels, e.g., as described below.

In some demonstrative embodiments, the EDMG CEF may have a structure, which may be compatible with the structure of CEF 200 (FIG. 2), e.g., as described below.

For example, the EDMG CEF may utilize sequences, which may have a sequence length, which is increased by a factor of ×3 or an integer multiple of ×3, for example, with respect to the sequences of CEF 200 structure of FIG. 2. According to this example, the EDMG CEF may utilize sequences, which may have a sequence length of 128*3=384. Such a configuration may allow, for example, preserving at least a same duration of the CEF field, and/or a same resolution in the frequency domain.

In some demonstrative embodiments, the sequences with the length of 384 may be defined, for example, at a sample rate of 3*1.76=5.28 GHz, or any other sample rate.

In some demonstrative embodiments, devices 102 and 140 may be configured to communicate an EDMG Physical Layer Convergence Protocol (PLCP) Protocol Data Unit (PPDU) over a channel in a frequency band above 45 Ghz, e.g., as described below.

In some demonstrative embodiments, the channel may have a channel bandwidth of 6.48 GHz or an integer multiple of 6.48 GHz, e.g., as described below.

In some demonstrative embodiments, controller 124 may be configured to cause, trigger, and/or control a wireless station implemented by device 102 to transmit the EDMG PPDU over the channel bandwidth of 6.48 GHz or an integer multiple of 6.48 GHz, e.g., as described below.

In some demonstrative embodiments, controller 124 may be configured to cause, trigger, and/or control the wireless station implemented by device 102 to generate and transmit a Single Carrier (SC) transmission including the EDMG PPDU, e.g., as described below.

In some demonstrative embodiments, controller 124 may be configured to cause, trigger, and/or control the wireless station implemented by device 102 to transmit an Orthogonal Frequency Division Multiplexing (OFDM) transmission including the EDMG PPDU, e.g., as described below.

In some demonstrative embodiments, controller 124 may be configured to cause, trigger, and/or control the wireless station implemented by device 102 to transmit a MIMO transmission including the EDMG PPDU, e.g., as described below.

In some demonstrative embodiments, controller 154 may be configured to cause, trigger, and/or control a wireless station implemented by device 140 to receive the EDMG PPDU, e.g., from device 102, over the channel bandwidth of 6.48 GHz or an integer multiple of 6.48 GHz, e.g., as described below.

In some demonstrative embodiments, controller 154 may be configured to cause, trigger, and/or control the wireless station implemented by device 140 to receive the EDMG PPDU, e.g., from device 102, a SC transmission including the EDMG PPDU, e.g., as described below.

In some demonstrative embodiments, controller 154 may be configured to cause, trigger, and/or control the wireless station implemented by device 140 to receive, e.g., from device 102, an OFDM transmission including the EDMG PPDU, e.g., as described below.

In some demonstrative embodiments, controller 154 may be configured to cause, trigger, and/or control the wireless station implemented by device 140 to receive, e.g., from device 102, a MIMO transmission including the EDMG PPDU, e.g., as described below.

In some demonstrative embodiments, the EDMG PPDU may include an EDMG CEF including a first sequence followed by a second sequence, e.g., as described below.

In some demonstrative embodiments, the EDMG PPDU may include any other additional or alternative fields, which may include, or may be based on the first and/or second sequences, e.g., as described below.

In some demonstrative embodiments, the EDMG PPDU may include a Training (TRN) field including at least one of the first sequence or the second sequence, e.g., as described below.

In some demonstrative embodiments, controller 154 may be configured to cause, trigger, and/or control the wireless station implemented by device 140 to determine a channel estimation between device 140 and device 102, e.g., by processing the EDMG CEF according to an EDMG CEF structure, e.g., as described below.

In some demonstrative embodiments, controller 154 may be configured to cause, trigger, and/or control the wireless station implemented by device 140 to process a communication with device 102 based on the channel estimation, e.g., as described below.

In some demonstrative embodiments, the EDMG CEF may include the first sequence, denoted Gu, having a length of 1536 followed by the second sequence, denoted Gv, having a length of 1536, e.g., as described below.

In some demonstrative embodiments, the first sequence Gu may be based on a first combination of a pair of Golay sequences, denoted (Ga, Gb), e.g., as described below.

In some demonstrative embodiments, the second sequence Gv may based on a second combination of the pair of Golay sequences (Ga, Gb), e.g., as described below.

In some demonstrative embodiments, each Golay sequence of the pair of Golay sequences (Ga, Gb) may have a sequence length ("length") of 384, e.g., as described below.

In some demonstrative embodiments, the EDMG CEF may include a third sequence following the second sequence, e.g., as described below.

In some demonstrative embodiments, the third sequence may include a sign inversed Golay sequence of the pair of Golay sequences, e.g., as described below.

In some demonstrative embodiments, the EDMG CEF may include some of the sequences and/or one or more additional or alternative sequences.

In some demonstrative embodiments, controller 124 may be configured to cause, trigger, and/or control the wireless station implemented by device 102 to modulate the EDMG CEF according to a π/2 Binary Phase-shift keying (BPSK) modulation, e.g., as described below.

For example, the Golay sequences (Ga384(n), Gb384(n)) may be multiplied by the exponent exp(j(π/2)*n) to create π/2-BPSK modulated symbols, e.g., as follows:

$$Ga384(n)*\exp(j(\pi/2)*n), n=0,1,\ldots,383$$

$$Gb384(n)*\exp(j(\pi/2)*n), n=0,1,\ldots,383$$

In other embodiments, controller 124 may be configured to cause, trigger, and/or control the wireless station implemented by device 102 to modulate the EDMG CEF according to any other additional or alternative modulation scheme.

In some demonstrative embodiments, controller 154 may be configured to cause, trigger, and/or control the wireless station implemented by device 140 to demodulate the EDMG CEF according to the π/2 BPSK modulation, e.g., as described below.

In other embodiments, controller 154 may be configured to cause, trigger, and/or control the wireless station implemented by device 140 to demodulate the EDMG CEF according to any other additional or alternative modulation scheme.

In some demonstrative embodiments, devices 102 and/or 140 may be configured to generate one or more of the Golay sequences, for example, to generate one or more of the EDMG CEF sequences, e.g., as described below.

For example, controller 124 may be configured to cause, trigger, and/or control the wireless station implemented by device 102 to determine one or more Golay sequences, for example, to generate one or more of the EDMG CEF sequences, e.g., as described below.

For example, controller 154 may be configured to cause, trigger, and/or control the wireless station implemented by device 140 to determine one or more Golay sequences, for example, to generate one or more of the EDMG CEF sequences, e.g., as described below.

In some demonstrative embodiments, device 102 may include a Golay sequence generator 127 configured to generate one or more Golay sequences, e.g., as described below.

In some demonstrative embodiments, device 140 may include a Golay sequence generator 157 configured to generate one or more Golay sequences, e.g., as described below.

In some demonstrative embodiments, controller 124 may include, operate as, and/or perform one or more functionalities of, Golay sequence generator 127 to generate one or more Golay sequences to be used by device 102, e.g., as described below.

In some demonstrative embodiments, controller 154 may include, operate as, and/or perform one or more functionalities of, Golay sequence generator 157 configured to generate one or more Golay sequences to be used by device 140, e.g., as described below.

In some demonstrative embodiments, Golay sequence generators 127 and/or 157 may be configured to determine the first sequence Gu having a length of 1536 based on the first combination of the pair of Golay sequences (Ga, Gb), e.g., as described below.

In some demonstrative embodiments, Golay sequence generators 127 and/or 157 may be configured to determine the second sequence Gv having a length of 1536 based on the second combination of the pair of Golay sequences (Ga, Gb), e.g., as described below.

In some demonstrative embodiments, Golay sequence generators 127 and/or 157 may generate the first sequence including a sequence $Gu^i{}_{1536}=[-Gb^i{}_{384}, -Ga^i{}_{384}, +Gb^i{}_{384}, -Ga^i{}_{384}]$, wherein $Ga^i{}_{384}$ denotes a first Golay sequence of the pair of Golay sequences, $Gb^i{}_{384}$ denotes a second Golay sequence of the pair of Golay sequences, and i denotes a spatial stream number, e.g., as described below.

In some demonstrative embodiments, Golay sequence generators 127 and/or 157 may generate the second sequence including a sequence $Gv^i{}_{1536}=[-Gb^i{}_{384}, +Ga^i{}_{384}, -Gb^i{}_{384}, -Ga^i{}_{384}]$, e.g., as described below.

Figure 3:
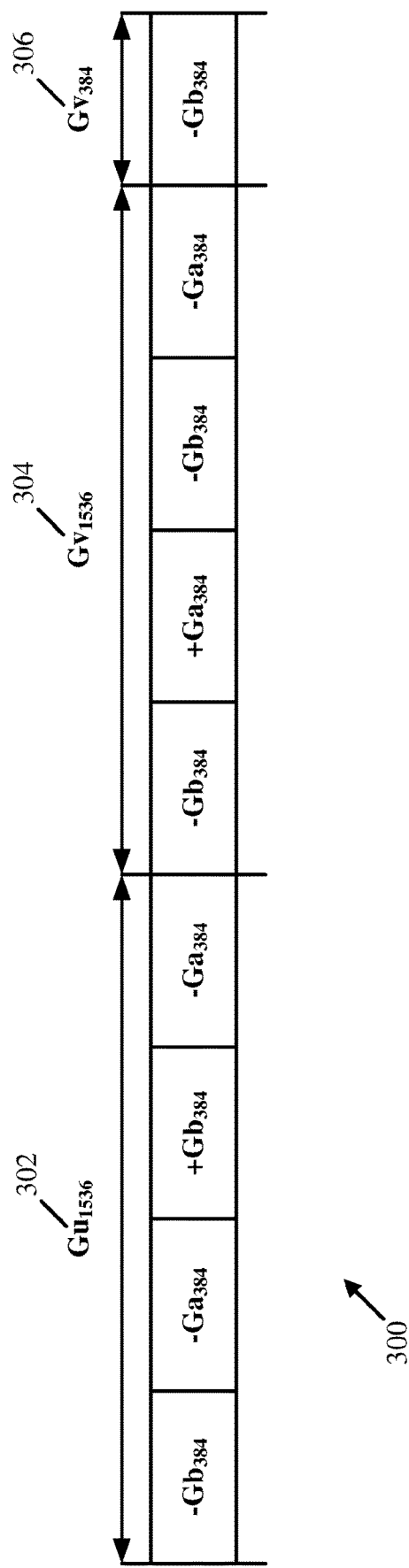
FIG. 3 is a schematic illustration of a CEF including Golay sequences with a sequence length of 384, in accordance with some demonstrative embodiments.

Reference is made to FIG. 3, which schematically illustrates a CEF 300 including Golay sequences with a length of 384, in accordance with some demonstrative embodiments.

In some demonstrative embodiments, device 102 (FIG. 1), and/or device 140 (FIG. 1) may be configured to process transmission and/or reception of CEF 300. For example, device 102 (FIG. 1) may be configured to generate and transmit an EDMG PPDU including CEF 300, and/or device 140 (FIG. 1) may be configured to receive and process the EDMG PPDU including CEF 300.

In some demonstrative embodiments, device 102 (FIG. 1) may be configured to transmit the EDMG PPDU including CEF 300 over a channel in a frequency band above 45 Ghz, the channel having a channel bandwidth of 6.48 GHz or an integer multiple of 6.48 GHz.

In some demonstrative embodiments, CEF 300 may include an EDMG-CEF structure, which may be configured to support, for example, at least a transmission, e.g., a SISO transmission and/or a MIMO transmission, with channel bonding ×3 or an integer multiple of ×3.

In some demonstrative embodiments, as shown in FIG. 3, CEF 300 may include Golay sequences with a length of 384, e.g., as described below.

In some demonstrative embodiments, as shown in FIG. 3, CEF 300 may include a first sequence 302, e.g., including a sequence, denoted Gu1536, having a length of 1536.

In some demonstrative embodiments, the first sequence 302, e.g., the sequence Gu1536, may be based on a first combination of a pair of Golay sequences, for example, the Golay sequences Ga and Gb, e.g., as described below.

In some demonstrative embodiments, each Golay sequence of the pair of Golay sequences Ga and Gb may have a length of 384, e.g., as described below.

For example, device 102 (FIG. 1) may determine the first sequence 302 having a length of 1536 based on the first combination of the pair of Golay sequences Ga and Gb having a length of 384, e.g., as described below.

In some demonstrative embodiments, as shown in FIG. 3, the first sequence 302 may include a sequence $Gu_{1536}$ $[-Gb_{384}, -Ga_{384}, +Gb_{384}, -Ga_{384}]$, wherein $Ga_{384}$ denotes a first Golay sequence of the pair of Golay sequences having a length of 384, and $Gb_{384}$ denotes a second Golay sequence of the pair of Golay sequences having a length of 384, e.g., as described below.

In some demonstrative embodiments, as shown in FIG. 3, CEF 300 may include a second sequence 304, e.g., including a sequence, denoted $Gv_{1536}$, having a length of 1536, e.g., as described below.

In some demonstrative embodiments, the second sequence 304, e.g., the sequence $Gv_{1536}$, may be based on a second combination of the pair of Golay sequences Ga and Gb, e.g., as described below.

For example, device 102 (FIG. 1) may determine the second sequence 304 having a length of 1536 based on the second combination of the pair of Golay sequences Ga and Gb having the length of 384, e.g., as described below.

In some demonstrative embodiments, as shown in FIG. 3, the second sequence 304 may include a sequence $Gv_{1536}=[-Gb_{384}, +Ga_{384}, -Gb_{384}, -Ga_{384}]$.

In some demonstrative embodiments, as shown in FIG. 3, CEF 300 may include a third sequence 306, e.g., including a sequence, denoted $Gv_{384}$, following second sequence 304.

For example, device 102 (FIG. 1) may determine the third sequence 306 having a length of 384, e.g., as described below.

In some demonstrative embodiments, the third sequence 306 may include a sign inversed Golay sequence of the pair of Golay sequences, e.g., as described below.

In some demonstrative embodiments, as shown in FIG. 3, the third sequence 306 may include a sequence $-Gb_{384}$, e.g., as described below.

Referring back to FIG. 1, in some demonstrative embodiments, controller 124 may be configured to cause, trigger, and/or control Golay sequence generator 127 to generate the pair of Golay sequences, for example, to generate one or more of the EDMG CEF sequences to be used by device 102, e.g., as described below.

In some demonstrative embodiments, a new type of Golay sequence may be defined, for example, since a Golay bipolar complementary pair including only {±1} elements of a length of 384 samples may not exist.

In some demonstrative embodiments, the Golay bipolar complementary pair with a length of 384 may be generated, for example, using quasi-phase complex Golay complementary pairs, for example, instead of using real value bipolar sequences, e.g., as described below.

In some demonstrative embodiments, the pair of Golay sequences (Ga, Gb) may include a pair of complementary quasi-phase complex Golay sequences, e.g., as described below.

In some demonstrative embodiments, the EDMG CEF may be defined using a complementary Golay pair (Ga384(n), Gb384(n)) of a length of 384 chips, e.g., as described below.

In some demonstrative embodiments, the Golay sequences (Ga384(n), Gb384(n)) may be defined, for example, at a chip rate of 1.76*3=5.28 GHz, or any other chip rate.

In some demonstrative embodiments, the Golay sequences Ga and Gb, may be defined using {±1} elements, supplemented with {±j} elements, e.g., to form a complex set {±1, ±j}, e.g., as described below.

In some demonstrative embodiments, the pair of Golay sequences (Ga, Gb) may include a first Golay sequence, e.g., the sequence Ga, formed by a first combination of the values {−1, 1, −j, j}, and a second Golay sequence, e.g., the sequence Gb, formed by a second combination of the values {−1, 1, −j, j}, e.g., as described below.

In some demonstrative embodiments, a complex Golay complementary pair of the length 3, denoted (Ga3,Gb3), may be defined based on complex set {±1, ±j}, e.g., as follows:

$$Ga3=[+1,+1,-1];$$

$$Gb3=[+1,+j,+1] \quad (5)$$

For example, the sequence Gb3 may be defined using an extra element +j.

In some demonstrative embodiments, the complex Golay complementary pair (Ga3,Gb3) may be used, for example, as basic sequences to generate one or more longer sequences, for example, including the Golay complementary pair (Ga384, Gb384), which may be utilized for the CEF ×3 definition.

Some demonstrative embodiments are described with respect to using the complex Golay complementary pair {Ga3=[+1, +1, −1]; Gb3=[+1, +j, +1]}. However, in other embodiments any other complex Golay sequences, e.g., of the length 3 or any other length, may be used.

Some demonstrative embodiments are described with respect to using the complex Golay complementary pair (Ga3, Gb3) to define the Golay complementary pair (Ga384, Gb384). However, in other embodiments, the complex Golay complementary pair (Ga3,Gb3) may be used to define any other additional or alternative Golay complementary pair.

In some demonstrative embodiments, the pair of Golay sequences may be based on a first vector, denoted Dk, and a second vector, denoted Wk, e.g., as described below.

For example, the vector Dk may include a delay vector, and/or the vector Wk may include a weight vector.

In some demonstrative embodiments, the vector Dk may include a vector [3 24 6 12 48 96 192]. In other embodiments, any other delay vector may be used.

For example, the vector Dk may be defined by multiplying elements of a delay vector for N=128 by 3, e.g., as follows:

$$Dk=[1\ 8\ 2\ 4\ 16\ 32\ 64]*3=[3\ 24\ 6\ 12\ 48\ 96\ 192] \quad (6)$$

In some demonstrative embodiments, the vector Wk may include seven elements, each element including the value (−1) or (+1), e.g., as described below. In other embodiments, the vector Wk may include any other values.

For example, the vector Wk may be defined based on elements of a weight vector for N=128, e.g., as follows:

$$Wk=[-1\ -1\ -1\ -1\ +1\ -1\ -1] \quad (7)$$

In other embodiments, the first and/or second vectors may include any other values.

In some demonstrative embodiments, the vector Wk may be based on a spatial stream number of at least one spatial stream to transmit the EDMG PPDU, e.g., as described below.

In some demonstrative embodiments, the vector Wk may be determined for a spatial stream number, e.g., as follows:

TABLE 1

| Spatial stream number | $W_k$ |
|---|---|
| 1 | [−1, −1, −1, −1, +1, −1, −1] |
| 2 | [−1, −1, −1, −1, +1, −1, −1] |
| 3 | [−1, −1, −1, +1, −1, −1, +1] |
| 4 | [−1, −1, −1, +1, −1, −1, +1] |
| 5 | [−1, −1, −1, +1, −1, +1, +1] |
| 6 | [−1, −1, −1, +1, −1, +1, +1] |
| 7 | [−1, −1, −1, +1, +1, +1, −1] |
| 8 | [−1, −1, −1, +1, +1, +1, −1] |

For example, controller 124 may be configured to cause, trigger, and/or control the wireless station implemented by device 102 to determine the vector Wk according to Table 1; and/or controller 154 may be configured to cause, trigger, and/or control the wireless station implemented by device 140 to determine the vector Wk according to Table 1.

In other embodiments, the vector Wk may include any other values, and/or may be determined for any other additional or alternative spatial stream number, e.g., as described below.

In some demonstrative embodiments, the pair of Golay sequences (Ga, Gb) may be based on the following recursive procedure:

$$A_k(n)=W_K A_{k-1}(n)+B_{k-1}(n-D_K)$$

$$B_k(n)=W_K A_{k-1}(n)-B_{k-1}(n-D_K) \quad (8)$$

wherein $A_0(n)$ is a function of $Gb_3(n)$, and $B_0(n)$ is a function of $Ga_3(n)$, wherein $Ga_3=[+1, +1, -1]$, and $Gb_3=[+1, +j, +1]$, and wherein $D_K$ denotes a vector [3 24 6 12 48 96 192], and $W_K$ denotes a vector based on a spatial stream number.

For example, controller 124 may be configured to cause, trigger, and/or control Golay sequence generator 127 to generate the pair of Golay sequences (Ga, Gb) according to the recursive procedure (8); and/or controller 154 may be configured to cause, trigger, and/or control Golay sequence generator 157 to generate the pair of Golay sequences (Ga, Gb) according to the recursive procedure (8).

In other embodiments, the pair of Golay sequences (Ga, Gb) may be based on any other recursive procedure, and/or any other Golay sequence generation procedure.

In some demonstrative embodiments, the sequences $A_0(n)$ and/or $B_0(n)$ at a zero iteration may include the sequences $Ga_3(3-n)$ and $Gb_3(3-n)$, with order of samples inverted in time, e.g., which are different from Dirac delta functions. This configuration may be, for example, in opposed to Golay sequences defined by an *IEEE 802.11ad Specification*.

In some demonstrative embodiments, the Golay complementary pair of length 384 (Ga384, Gb384) may be determined, for example, by starting from the length N=3 and performing 7 iterations of the recursive procedure (8), e.g., until achieving the required sequence length of 128*3=384.

In some demonstrative embodiments, the sequences Ga384 and/or Gb384 may be defined, for example, based on the sequences $A_7$ and $B_7$, e.g., as follows:

$$Ga384(n)=\text{conj}(A_7(384-n)), Gb384(n)=\text{conj}(B_7(384-n)) \quad (9)$$

wherein, for example, the sequence is inverted in time and complex conjugated, and wherein the index n starts from 1.

In some demonstrative embodiments, the sequences Ga384 and/or Gb384 may be defined, for example, based on the sequences $A_7$ and $B_7$, e.g., as follows:

$$Ga384(n)=\text{conj}(A_7(383-n)), Gb384(n)=\text{conj}(B_7(383-n)) \quad (10)$$

wherein the index n starts from 0.

In some demonstrative embodiments, for example, once per 6 symbols, the phase of adjacent samples may experience π-radian flip, for example, even after application of a rotation of exp(j(π/2)*n). However, this flip may not substantially affect Peak to Average Power Ratio (PAPR) properties of a signal at an output of a pulse shaping filter.

In some demonstrative embodiments, the Golay sequences Ga384 and/or Gb384 may be defined, for example, for a spatial stream number i=1, e.g., as follows:

$Ga_{384}=\{+1\ -j\ +1\ +1\ +1\ -1\ -1\ +j\ -1\ -1\ -1\ +1\ -1\ +j$
$-1\ -1\ -1\ -1\ +j\ -1\ -1\ -1\ +1\ -1\ +j\ -1\ +1$
$+1\ -1\ -1\ +j\ -1\ +1\ +1\ -1\ +1\ -j\ +1\ -1\ +1\ +1$
$-1\ +j\ -1\ +1\ +1\ -1\ +1\ -j\ +1\ +1\ +1\ -1\ -1\ +j\ -1$
$-1\ -1\ +1\ +1\ -j\ +1\ +1\ +1\ -1\ +1\ -j\ +1\ +1$
$-1\ -1\ +j\ -1\ +1\ +1\ -1\ +j\ -1\ +1\ +1\ -1\ -1\ +j$
$-1\ +1\ +1\ -1\ +1\ -j\ +1\ -1\ +1\ -1\ +j\ -1\ -1$
$-1\ +1\ +1\ -j\ +1\ +1\ +1\ -1\ +1\ -j\ +1\ +1\ -1$
$+1\ -j\ +1\ +1\ +1\ -1\ +1\ -j\ +1\ -1\ -1\ +1\ +1\ -j\ +1$
$-1\ -1\ +1\ +1\ +j\ -1\ +1\ +1\ -1\ +1\ -j\ +1\ +1$
$+1\ +1\ -j\ +1\ +1\ +1\ -1\ -1\ +j\ -1\ -1\ -1\ +1\ +1\ -j$
$+1\ +1\ +1\ -1\ +1\ -j\ +1\ +1\ +1\ -1\ -1\ +j\ -1\ -1$
$+1\ -1\ -1\ +j\ -1\ +1\ +1\ -1\ +j\ -1\ +1\ +1\ -1$
$+1\ -j\ +1\ -1\ -1\ +1\ +1\ -j\ +1\ +1\ +1\ -1\ +j\ -1$
$-1\ -1\ +1\ +1\ +j\ -1\ +1\ -1\ +1\ -1\ +j\ -1\ -1$
$+1\ -1\ +j\ -1\ +1\ +1\ -1\ -1\ +j\ -1\ +1\ +1\ -1\ +1\ -j$
$+1\ -1\ -1\ +1\ -1\ +j\ -1\ +1\ +1\ +1\ -j\ +1\ +1$
$+1\ -1\ -1\ +j\ -1\ +1\ +1\ -j\ +1\ +1\ +1\ -1$
$+1\ -j\ +1\ +1\ +1\ -1\ -1\ +j\ -1\ +1\ +1\ -1\ -1\ +j\ -1$
$+1\ +1\ -1\ -1\ +j\ -1\ +1\ +1\ -1\ +1\ -j\ +1\ -1\ -1$
$+1\ +1\ -j\ +1\ +1\ +1\ -1\ -1\ +j\ -1\ -1\ -1\ +1\ -1\ +j$
$-1\ -1\ -1\ +1\ -1\ +j\ -1\ -1\ -1\ +1\ +1\ -j\ -1\ +1$
$+1\ -1\ -1\ +j\ -1\ +1\ +1\ -1\ -1\ +j\ -1\ +1$
$-1\ +j\ -1\ +1\ +1\ -1\ +j\ -1\ -1\ -1\ +1\ +1\ -j\ +1$
$+1\ +1\ -1\ -1\ +j\ -1\ -1\ -1\ +1\ -1\ +j\ -1\ -1$
$+1\ +1\ -j\ +1\ -1\ -1\ +1\ +1\ -j\ +1\ -1\ -1\ +1\ +1\ -j$
$+1\ -1\ -1\ +1\ -1\ +j\ -1\ +1\ +1\ -1\}$ $Gb_{384}=\{-1\ +j\ -1\ -1\ -1\ +1\ +1\ -j\ +1\ +1\ +1\ -1\ +1\ -j$
$+1\ +1\ +1\ -1\ +1\ -j\ +1\ +1\ +1\ -1\ -j\ +1\ -1$
$-1\ +1\ +1\ -j\ +1\ -1\ -1\ +1\ +1\ -j\ +1\ -1\ +1$
$+1\ -j\ +1\ -1\ -1\ +1\ +j\ -1\ -1\ -1\ +1\ +1\ -j\ +1$
$+1\ +1\ -1\ -1\ +j\ -1\ -1\ -1\ +1\ +j\ -1\ -1$
$+1\ +1\ -j\ +1\ -1\ -1\ +1\ +1\ -j\ +1\ -1\ -1\ +1\ +1\ -j$
$+1\ -1\ -1\ +1\ -1\ +j\ -1\ -1\ -1\ +1\ -j\ +1\ +1$
$+1\ -1\ +j\ -1\ -1\ -1\ +1\ +j\ -1\ -1\ +1\ -1$
$-1\ +j\ -1\ -1\ -1\ +1\ +j\ -1\ +1\ +1\ -1\ -1\ +j\ -1$
$+1\ +1\ -1\ +1\ -j\ +1\ -1\ -1\ +1\ +j\ -1\ +1$
$-1\ -1\ +j\ -1\ -1\ -1\ +1\ -j\ +1\ +1\ +1\ -1\ -1\ +j$
$-1\ -1\ -1\ +1\ -1\ +j\ -1\ -1\ -1\ +1\ +1\ -j\ +1\ -1$ $-1\ +1\ +1\ -j\ +1\ -1\ -1\ +1\ +1\ -j\ +1\ -1\ -1\ +1$
$-1\ +j\ -1\ +1\ +1\ -1\ +1\ -j\ +1\ +1\ +1\ -1\ -1\ +j\ -1$
$-1\ -1\ +1\ -1\ +j\ -1\ -1\ +1\ -1\ +j\ -1\ -1\ -1$
$+1\ -1\ +j\ -1\ +1\ +1\ -1\ -1\ +j\ -1\ +1\ +1\ -1\ +1\ -j$
$+1\ -1\ -1\ +1\ -1\ +j\ +1\ +1\ -1\ +1\ -j\ +1\ +1$
$+1\ -1\ -1\ +j\ -1\ -1\ -1\ +1\ +1\ -j\ +1\ +1\ -1$
$+1\ -j\ +1\ +1\ -1\ -1\ +j\ -1\ +1\ +1\ +1\ -1\ +j\ -1$
$+1\ +1\ -1\ -1\ +j\ -1\ +1\ +1\ -1\ +1\ -j\ -1\ -1$
$+1\ +1\ -j\ +1\ +1\ -1\ -1\ +j\ -1\ -1\ -1\ +1\ -1\ +j$
$-1\ -1\ -1\ +1\ -1\ +j\ -1\ -1\ -1\ +1\ +1\ -j\ +1$
$+1\ -1\ -1\ +j\ -1\ -1\ +1\ -1\ +j\ -1\ -1$
$+1\ -1\ +j\ -1\ +1\ +1\ -1\ +j\ -1\ -1\ -1\ +1\ +1\ -j\ +1$
$+1\ +1\ -1\ -1\ +j\ -1\ -1\ -1\ +1\ +j\ -1\ -1$
$+1\ +1\ -j\ +1\ -1\ -1\ +1\ +1\ -j\ +1\ -1\ -1\ +1\ +1\ -j$
$+1\ -1\ -1\ +1\ -1\ +j\ -1\ +1\ +1\ -1\}$ (11)

In other embodiments, the Golay sequences Ga384 and/or Gb384 may be defined using other values.

Figure 4:
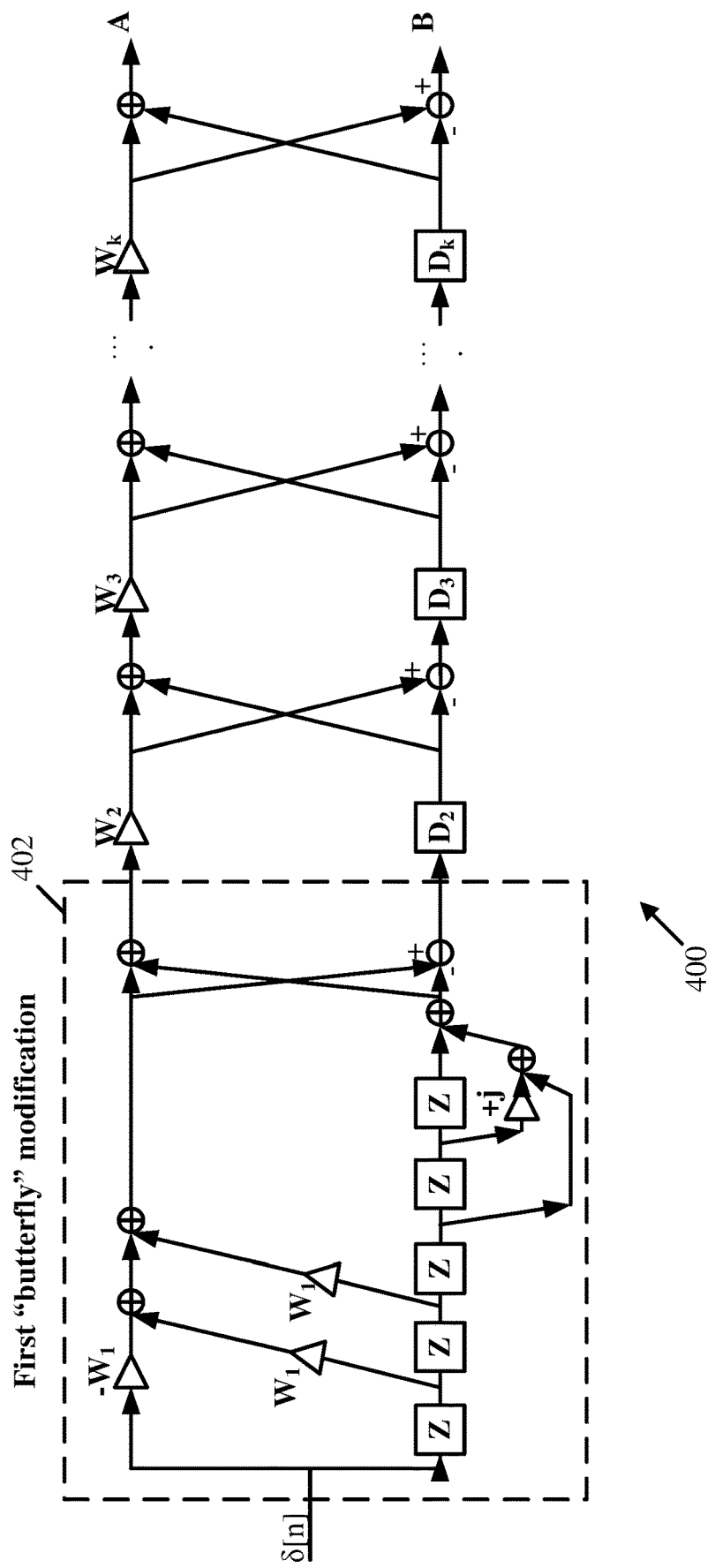
FIG. 4 is a schematic illustration of a Golay sequence generator, in accordance with some demonstrative embodiments.

Reference is made to FIG. 4, which schematically illustrates a Golay sequence generator 400, in accordance with some demonstrative embodiments. For example, Golay sequence generator 127 (FIG. 1) may implement one or more elements and/or functionalities of Golay sequence generator 400; and/or Golay sequence generator 157 (FIG. 1) may implement one or more elements and/or functionalities of Golay sequence generator 400.

In some demonstrative embodiments, Golay sequence generator 400 may be configured to generate the Golay sequences Ga384 and/or Gb384, e.g., as described below.

For example, the Golay sequences Ga384 and/or Gb384 may be generated, for example, using a modification of a Golay sequence generator for the sequences Ga128 and Gb128, e.g., as described below.

In some demonstrative embodiments, as shown in FIG. 4, Golay sequence generator 400 may include delay components, denoted D, for example, configured in accordance with the delay vector Dk, e.g., the vector [24 6 12 48 96 192].

In some demonstrative embodiments, as shown in FIG. 4, Golay sequence generator 400 may include weight components, denoted W, for example, configured according to the weight vector Wk, e.g., as described above.

In some demonstrative embodiments, one or more delays of Golay sequence generator 400, for example, all Golay generator delays, e.g., except for the delay D=1, may be multiplied by the factor of 3.

In some demonstrative embodiments, as shown in FIG. 4, Golay sequence generator 400 may include a modification of a first "butterfly" 402, e.g., as described below.

For example, as shown in FIG. 4, Golay sequence generator 400 may utilize the modification of first "butterfly" 402 for the delay D=1, e.g., to replace it by the delay D=5.

In some demonstrative embodiments, a total number of delays utilized in this Golay generation scheme may be equal to 383=5+24+6+12+48+96+192. Accordingly, a number of delays utilized may be equal to N−1, where N is a length of the sequence, e.g., as for a "regular" Golay generator.

In some demonstrative embodiments, as shown in FIG. 4, Golay sequence generator 400 may be configured to use a Dirac delta function δ(n) as an input.

In other demonstrative embodiments, a Golay correlator may be configured, while using the sequences Ga384 or Gb384 as an input, for example, instead of a Dirac delta function δ(n).

Referring back to FIG. 1, in some demonstrative embodiments, devices 102 and/or 140 may be configured to utilize a Golay sequence set, which may be configured, for example, for MIMO transmission, e.g., as described below.

In some demonstrative embodiments, a Single Carrier (SC) Physical Layer (PHY) MIMO transmission may utilize transmission of $N_{STS}$ space-time streams. For example, a signal in each space-time stream may be defined using a Golay Sequence Set (GSS) including $N_{STS}$ sequences, e.g., as described below.

In some demonstrative embodiments, an EDMG-CEF structure may be defined, for example, with respect to a length of 384 and/or the sequences Ga384 and Gb384, e.g., as described above.

In some demonstrative embodiments, the EDMG-CEF structure may be configured, for example, using the structure of CEF 300 (FIG. 3) and/or any other CEF structure.

In some demonstrative embodiments, a single user MIMO (SU-MIMO) transmission may be defined, for example, with respect to $N_{STS}$=8, e.g., as a maximum number of streams. In other embodiments, any other number of streams, e.g., less than 8 streams or more than 8 streams, may be used.

In some demonstrative embodiments, a multi user MIMO (MU-MIMO) transmission may be defined, for example, with respect to $N_{STS}$=16, e.g., as a maximum number of streams. In other embodiments, any other number of streams, e.g., less than 16 streams or more than 16 streams, may be used.

In some demonstrative embodiments, devices 102 and/or 140 may be configured to utilize a GSS, which may include 16 sequences. For example, a subset of first 8 sequences may be used for a SU-MIMO EDMG-CEF definition; and/or one or more of the remaining 8 sequences may be used, for example, for a MU-MIMO EDMG-CEF definition.

In some demonstrative embodiments, a GSS may be defined, for example, using one or more of the following definitions and/or settings:

Delay vector is fixed and not dependent on the stream number, e.g., using the following weight vector and/or any other weight vector:
$D_k$=[3, 24, 6, 12, 48, 96, 192];

Weight vector depends on the stream number, e.g., using one of the following weight vectors and/or any other additional or alternative weight vectors:
Streams 1 and 2: $W_k$=[-1,-1,-1,-1,+1,-1,-1];
Streams 3 and 4: $W_k$=[-1,-1,-1,+1,-1,-1,+1];
Streams 5 and 6: $W_k$=[-1,-1,-1,+1,-1,+1,+1];
Streams 7 and 8: $W_k$=[-1,-1,-1,+1,+1,+1,-1];
Streams 9 and 10: $W_k$=[-1, -1, 1, -1, -1, 1, -1];
Streams 11 and 12: $W_k$=[-1, -1, 1, -1, 1, -1, 1];
Streams 13 and 14: $W_k$=[-1, -1, 1, -1, 1, 1, 1];
Streams 15 and 16: $W_k$=[-1, -1, 1, 1, -1, 1, -1];

Input definition:
Streams 1, 3, 5, 7, 9, 11, 13, 15: ($A_0$(n), $B_0$(n))=(+$Ga_3$(3-n), +$Gb_3$(3-n)), here n starts from 1. If n starts from 0 then (3-n) should be replaced with (2-n), the same is true for the next row;
Streams 2, 4, 6, 8, 10, 12, 14, 16: ($A_0$(n), $B_0$(n))=(+conj($Gb_3$(3-n)), -conj($Ga_3$(3-n)))—Zero Cross Correlated (ZCC) sequences;

For example, to obtain the ZCC sequences for the streams 2, 4, 6, 8, 10, 12, 14, and 16 a simple modification may be applied to the first butterfly, e.g., first butterfly 402 (FIG. 4): switch between A and B, complex conjugation and sign inversion;

Output definition:
Streams 1-16: ($Ga_{384}$(n), $Gb_{384}$(n))=(+conj($A_7$(384-n)), +conj($B_7$(384-n))), here n starts from 1. If n starts from 0 then (384-n) should be replaced with (383-n).

In some demonstrative embodiments, one or more additional or alternative definitions, settings, and/or operations may be used to determine the GSS.

In some demonstrative embodiments, the same first 8 sequences may be used for both SU-MIMO and MU-MIMO transmissions, for example, in an implementation where the number of streams is not extended for the MU-MIMO transmission, e.g., from 8 to 16.

Some demonstrative embodiments are described above with respect to a CEF utilizing Golay sequences with a length of 384. However, in other embodiments, Golay sequences of a different length may be used, e.g., as described below.

In some demonstrative embodiments, devices 102 and/or 140 may be configured to utilize a CEF based on Golay sequences of a length 256, e.g., as described below.

In some demonstrative embodiments, an EDMG-CEF for a channel bonding of 3 channels may be defined using the Golay complementary pairs (Ga256, Gb256), for example, to define GSS for a maximum of 8 streams, or even for up to 16 streams.

In some demonstrative embodiments, a pair of sequences Gu1024 and Gu1024 with a length of 1024 samples may be defined, e.g., as follows:

$$Gu_{1024}=[-Gb256,-Ga256,+Gb256,-Ga256];$$

$$Gv_{1024}=[-Gb256,+Ga256,-Gb256,-Ga256] \quad (12)$$

For example, the sequences may be defined at the sample rate of 3*1.76=5.28 GHz.

In some demonstrative embodiments, the sequences may be multiplied by the exponent $\exp(j(\pi/2)*n)$, for example, to create $\pi/2$-BPSK modulated symbols, e.g., as follows:

$$Ga256(n)*\exp(j(\pi/2)*n),n=0,1,\ldots,255$$

$$Gb256(n)*\exp(j(\pi/2)*n),n=0,1,\ldots,255 \quad (13)$$

In some demonstrative embodiments, for example, for a SISO case, the EDMG-CEF field may be defined, according to one example, e.g., as follows:

$$\text{EDMG-CEF}=[Gu1024,Gv1024,Gu1024,-Gb256,-Gb128] \quad (14)$$

In some demonstrative embodiments, for example, for a SISO case, the EDMG-CEF field may be defined, according to another example, e.g., as follows:

$$\text{EDMG-CEF}=[Gu1024,Gu1024,Gv1024,-Gb256,-Gb128] \quad (15)$$

In some demonstrative embodiments, for example, for a SISO case, the EDMG-CEF field may be defined, according to another example, e.g., as follows:

$$\text{EDMG-CEF}=[Gv1024,Gu1024,Gu1024,-Gb256,-Gb128] \quad (16)$$

In some demonstrative embodiments, the sequence Gb128 may be multiplied by the exponent $\exp(j(\pi/2)*n)$, for example, to create $\pi/2$-BPSK modulated symbols, e.g., as follows:

$$Gb128(n)*\exp(j(\pi/2)*n),n=0,1,\ldots,127 \quad (17)$$

In some demonstrative embodiments, an EDMG-CEF structure may be defined, for example, using one of the possible options defined above.

Figure 5:
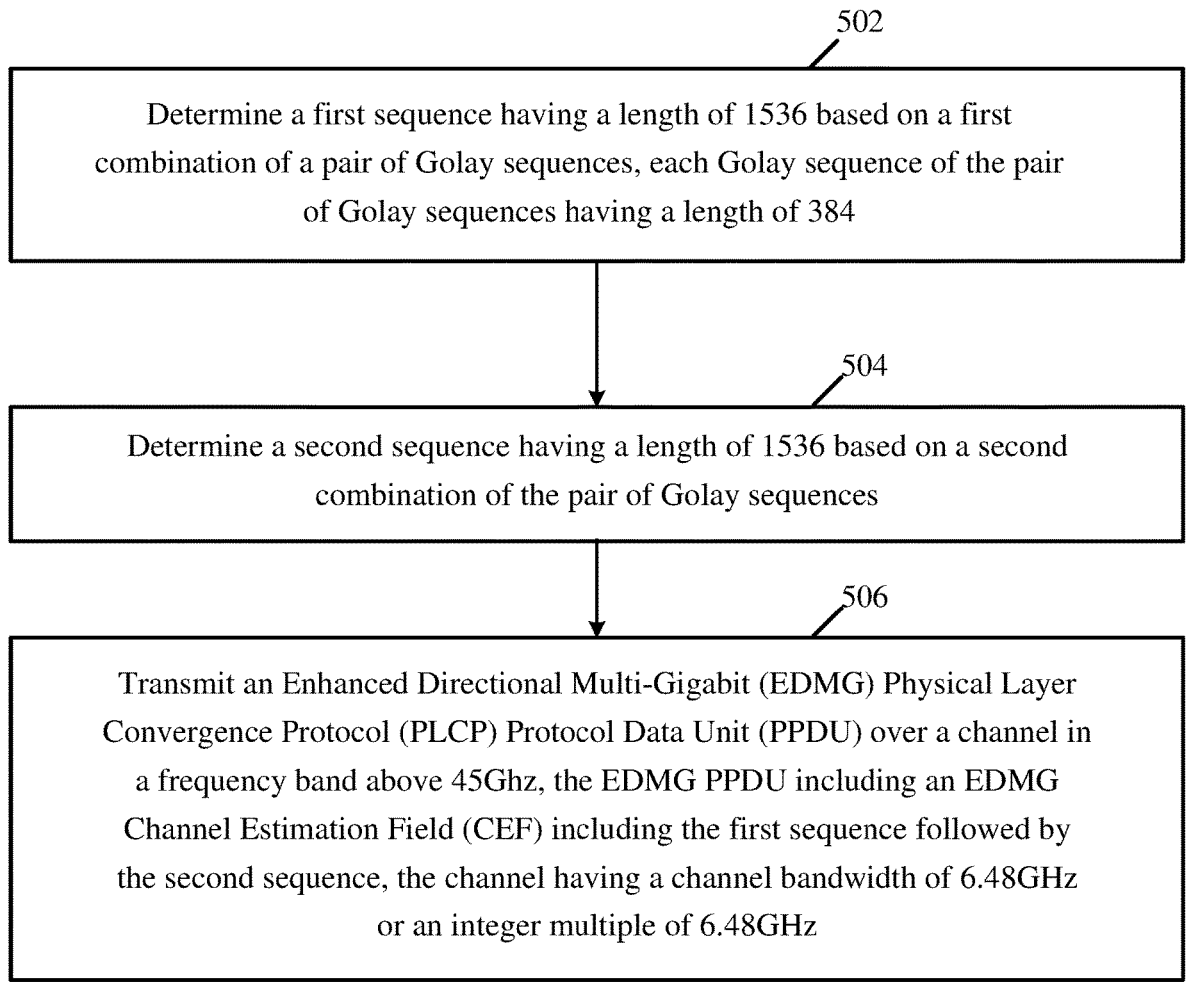
FIG. 5 is a schematic flow-chart illustration of a method of communicating a channel estimation field with Golay sequences, in accordance with some demonstrative embodiments.

Reference is made to FIG. 5, which schematically illustrates a method of communicating a channel estimation field with Golay Sequences, in accordance with some demonstrative embodiments. For example, one or more of the operations of the method of FIG. 5 may be performed by one or more elements of a system, e.g., system 100 (FIG. 1), for example, one or more wireless devices, e.g., device 102 (FIG. 1), and/or device 140 (FIG. 1); a controller, e.g., controller 124 (FIG. 1), and/or controller 154 (FIG. 1); a Golay sequence generator, e.g., Golay sequence generator 127 (FIG. 1), and/or Golay sequence generator 157 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver e.g., receiver 116 (FIG. 1), and/or receiver 146 (FIG. 1); and/or a message processor, e.g., message processor 128 (FIG. 1), and/or message processor 158 (FIG. 1).

As indicated at block 502, the method may include determining a first sequence having a length of 1536 based on a first combination of a pair of Golay sequences, each Golay sequence of the pair of Golay sequences having a length of 384. For example, Golay sequence generator 127 (FIG. 1) may determine the first sequence having a length of 1536 based on the first combination of the pair of Golay sequences, each Golay sequence of the pair of Golay sequences having a length of 384, e.g., as described above.

As indicated at block 504, the method may include determining a second sequence having a length of 1536 based on a second combination of the pair of Golay sequences. For example, Golay sequence generator 127 (FIG. 1) may determine the second sequence having a length of 1536 based on the second combination of the pair of Golay sequences, e.g., as described above.

As indicated at block 506, the method may include transmitting an EDMG PPDU over a channel in a frequency band above 45 Ghz, the EDMG PPDU including an EDMG CEF including the first sequence followed by the second sequence, the channel having a channel bandwidth of 6.48 GHz or an integer multiple of 6.48 GHz. For example, controller 124 (FIG. 1) may cause the wireless station implemented by device 102 (FIG. 1) to transmit the EDMG PPDU over the channel in a frequency band above 45 Ghz, e.g., as described above.

Figure 6:
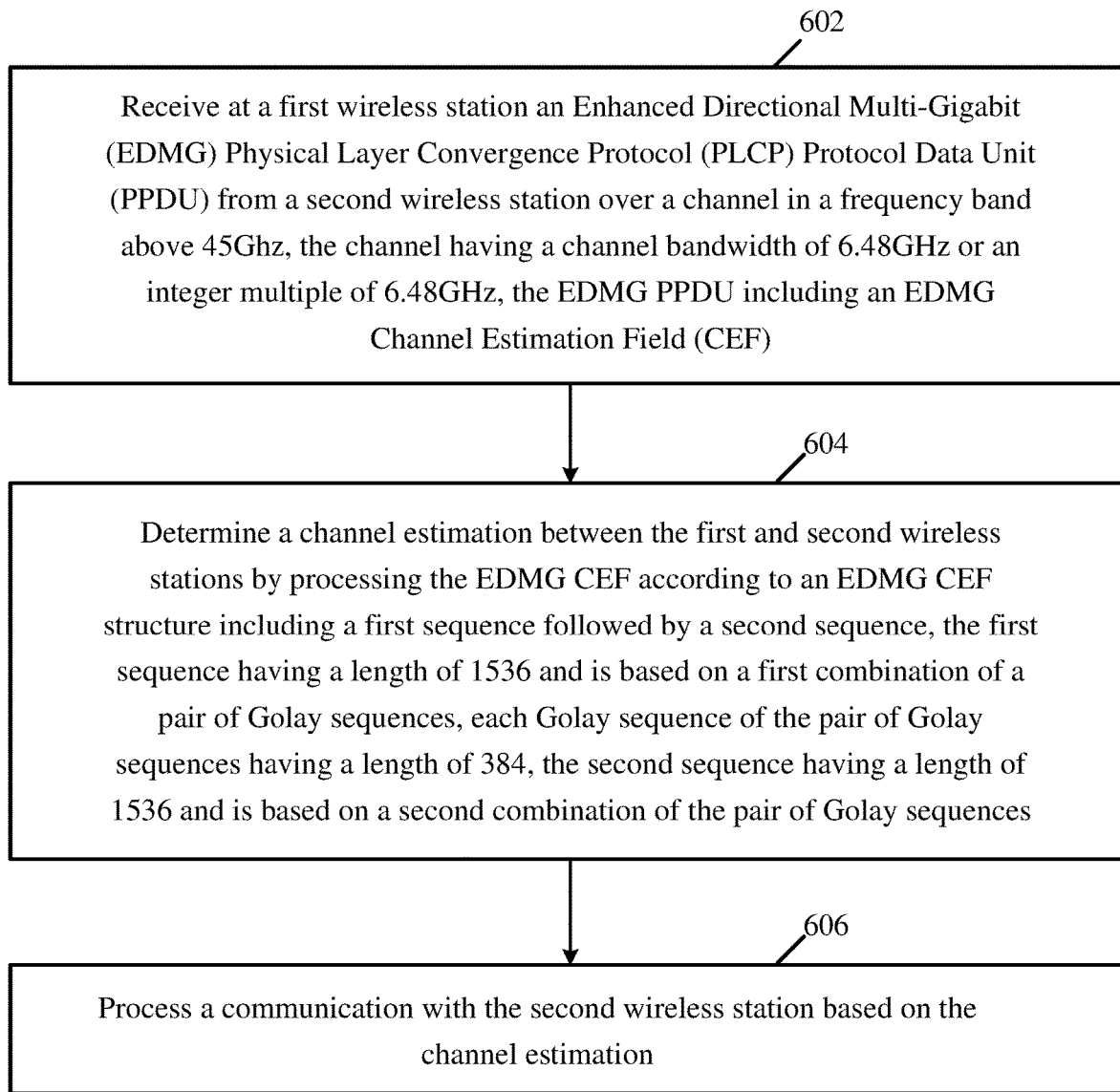
FIG. 6 is a schematic flow-chart illustration of a method of communicating a channel estimation field with Golay sequences, in accordance with some demonstrative embodiments.

Reference is made to FIG. 6, which schematically illustrates a method of communicating a channel estimation field with Golay Sequences, in accordance with some demonstrative embodiments. For example, one or more of the operations of the method of FIG. 5 may be performed by one or more elements of a system, e.g., system 100 (FIG. 1), for example, one or more wireless devices, e.g., device 102 (FIG. 1), and/or device 140 (FIG. 1); a controller, e.g., controller 124 (FIG. 1), and/or controller 154 (FIG. 1); a Golay sequence generator, e.g., Golay sequence generator 127 (FIG. 1), and/or Golay sequence generator 157 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver e.g., receiver 116 (FIG. 1), and/or receiver 146 (FIG. 1); and/or a message processor, e.g., message processor 128 (FIG. 1), and/or message processor 158 (FIG. 1).

As indicated at block 602, the method may include receiving an EDMG PPDU from a second wireless station over a channel in a frequency band above 45 Ghz, the channel having a channel bandwidth of 6.48 GHz or an integer multiple of 6.48 GHz, the EDMG PPDU including an EDMG CEF. For example, controller 154 (FIG. 1) may cause the wireless station implemented by device 140 (FIG. 1) to receive the EDMG PPDU including the EDMG CEF from a second wireless station implemented by device 102 (FIG. 1) over a channel in a frequency band above 45 Ghz, e.g., as described above.

As indicated at block 604, the method may include determining a channel estimation between the first and second wireless stations by processing the EDMG CEF according to an EDMG CEF structure including a first sequence followed by a second sequence, the first sequence having a length of 1536 and is based on a first combination of a pair of Golay sequences, each Golay sequence of the pair of Golay sequences having a length of 384, the second sequence having a length of 1536 and is based on a second combination of the pair of Golay sequences. For example, controller 154 (FIG. 1) may cause the wireless station implemented by device 140 (FIG. 1) to determine the channel estimation between device 102 (FIG. 1) and device 140 (FIG. 1) by processing the EDMG CEF according to the EDMG CEF structure, e.g., as described above.

As indicated at block 606, the method may include processing a communication with the second wireless station based on the channel estimation. For example, controller 154 (FIG. 1) may cause the wireless station implemented by device 140 (FIG. 1) to process the communication with device 102 (FIG. 1) based on the channel estimation, e.g., as described above.

Figure 7:
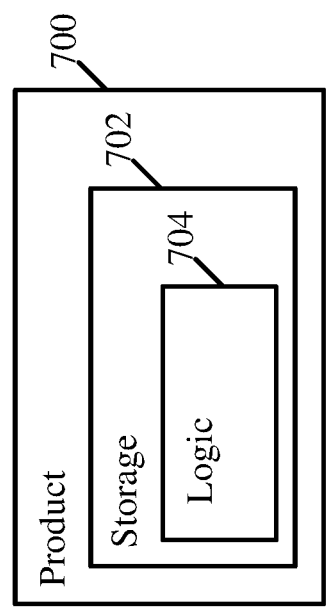
FIG. 7 is a schematic illustration of a product of manufacture, in accordance with some demonstrative embodiments.

Reference is made to FIG. 7, which schematically illustrates a product of manufacture 700, in accordance with some demonstrative embodiments. Product 700 may include one or more tangible computer-readable non-transitory storage media 702, which may include computer-executable instructions, e.g., implemented by logic 704, operable to, when executed by at least one processor, e.g., computer processor, enable the at least one processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), Golay sequence generator 127 (FIG. 1), Golay sequence generator 157 (FIG. 1), message processor 128 (FIG. 1), and/or message processor 158 (FIG. 1), to cause device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), 1), receiver 146 (FIG. 1), controller 124 (FIG. 1), controller 154 (FIG. 1), Golay sequence generator 127 (FIG. 1), Golay sequence generator 157 (FIG. 1), message processor 128 (FIG. 1), and/or message processor 158 (FIG. 1) to perform one or more operations, and/or to perform, trigger and/or implement one or more operations, communications and/or functionalities described above with reference to FIGS. 1, 2, 3, 4, 5, and/or 6, and/or one or more operations described herein. The phrase "non-transitory machine-readable medium" is directed to include all computer-readable media, with the sole exception being a transitory propagating signal.

In some demonstrative embodiments, product 700 and/or storage media 702 may include one or more types of computer-readable storage media capable of storing data, including volatile memory, non-volatile memory, removable or non-removable memory, erasable or non-erasable memory, writeable or re-writeable memory, and the like. For example, machine-readable storage media 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS)

memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, firmware, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a wireless station to determine a first sequence having a length of 1536 based on a first combination of a pair of Golay sequences, each Golay sequence of the pair of Golay sequences having a length of 384; determine a second sequence having a length of 1536 based on a second combination of the pair of Golay sequences; and transmit an Enhanced Directional Multi-Gigabit (EDMG) Physical Layer Convergence Protocol (PLCP) Protocol Data Unit (PPDU) over a channel in a frequency band above 45 Ghz, the EDMG PPDU comprising an EDMG Channel Estimation Field (CEF) comprising the first sequence followed by the second sequence, the channel having a channel bandwidth of 6.48 GHz or an integer multiple of 6.48 GHz.

Example 2 includes the subject matter of Example 1, and optionally, wherein the pair of Golay sequences comprises a pair of complementary quasi-phase complex Golay sequences.

Example 3 includes the subject matter of Example 1 or 2, and optionally, wherein the pair of Golay sequences comprises a first Golay sequence formed by a first combination of the values {−1, 1, −j, j}, and a second Golay sequence formed by a second combination of the values {−1, 1, −M}.

Example 4 includes the subject matter of any one of Examples 1-3, and optionally, wherein the pair of Golay sequences are based on a first vector and a second vector, the first vector comprising a vector [3 24 6 12 48 96 192], the second vector comprising seven elements, each element comprising the value (−1) or (+1).

Example 5 includes the subject matter of Example 4, and optionally, wherein the second vector is based on a spatial stream number of at least one spatial stream to transmit the EDMG PPDU.

Example 6 includes the subject matter of Example 5, and optionally, wherein the second vector, denoted $W_K$, is determined for a spatial stream number as follows:

| Spatial stream number | $W_K$ |
|---|---|
| 1 | [−1, −1, −1, −1, +1, −1, −1] |
| 2 | [−1, −1, −1, −1, +1, −1, −1] |
| 3 | [−1, −1, −1, +1, −1, −1, +1] |
| 4 | [−1, −1, −1, +1, −1, −1, +1] |
| 5 | [−1, −1, −1, +1, −1, +1, +1] |
| 6 | [−1, −1, −1, +1, −1, +1, +1] |
| 7 | [−1, −1, −1, +1, +1, +1, −1] |
| 8 | [−1, −1, −1, +1, +1, +1, −1] |

Example 7 includes the subject matter of any one of Examples 1-6, and optionally, wherein the pair of Golay sequences are based on the following recursive procedure:

$$A_k(n) = W_K A_{k-1}(n) + B_{k-1}(n - D_K)$$

$$B_k(n) W_K A_{k-1}(n) - B_{k-1}(n - D_K)$$

wherein $A_0(n)$ is a function of $Gb_3(n)$, and $B_0(n)$ is a function of $Ga_3(n)$, wherein $Ga_3 = [+1, +1, −1]$, and $Gb_3 = [+1, +j, +1]$, and wherein $D_K$ denotes a vector [3 24 6 12 48 96 192], and $W_K$ denotes a vector based on a spatial stream number.

Example 8 includes the subject matter of any one of Examples 1-7, and optionally, wherein the first sequence comprises a sequence $Gu^i_{1536} = [-Gb^i_{384}, -Ga^i_{384}, +Gb^i_{384}, -Ga^i_{384}]$, and the second sequence comprises a sequence $Gv^i_{1536} = [-Gb^i_{384}, +Ga^i_{384}, -Gb^i_{384}, -Ga^i_{384}]$, wherein $Ga^i_{384}$ denotes a first Golay sequence of the pair of Golay sequences, $Gb^i_{384}$ denotes a second Golay sequence of the pair of Golay sequences, and i denotes a spatial stream number.

Example 9 includes the subject matter of any one of Examples 1-8, and optionally, wherein the EDMG CEF comprises a third sequence following the second sequence, the third sequence comprising a sign inversed Golay sequence of the pair of Golay sequences.

Example 10 includes the subject matter of any one of Examples 1-9, and optionally, wherein the apparatus is configured to cause the wireless station to modulate the EDMG CEF according to a π/2 Binary Phase-shift keying (BPSK) modulation.

Example 11 includes the subject matter of any one of Examples 1-10, and optionally, wherein the EDMG PPDU comprises a Training (TRN) field comprising at least one of the first sequence or the second sequence.

Example 12 includes the subject matter of any one of Examples 1-11, and optionally, wherein the apparatus is configured to cause the wireless station to transmit a Single Carrier (SC) transmission comprising the EDMG PPDU.

Example 13 includes the subject matter of any one of Examples 1-11, and optionally, wherein the apparatus is configured to cause the wireless station to transmit an Orthogonal Frequency Division Multiplexing (OFDM) transmission comprising the EDMG PPDU.

Example 14 includes the subject matter of any one of Examples 1-13, and optionally, wherein the apparatus is configured to cause the wireless station to transmit a Multiple-Input-Multiple-Output (MIMO) transmission comprising the EDMG PPDU.

Example 15 includes the subject matter of any one of Examples 1–14, and optionally, comprising a radio to transmit the EDMG PPDU.

Example 16 includes the subject matter of any one of Examples 1–15, and optionally, comprising one or more antennas, a memory, and a processor.

Example 17 includes a system of wireless communication comprising a wireless station, the wireless station comprising one or more antennas; a radio; a memory; a processor; and a controller configured to cause the wireless station to determine a first sequence having a length of 1536 based on a first combination of a pair of Golay sequences, each Golay sequence of the pair of Golay sequences having a length of 384; determine a second sequence having a length of 1536 based on a second combination of the pair of Golay sequences; and transmit an Enhanced Directional Multi-Gigabit (EDMG) Physical Layer Convergence Protocol (PLCP) Protocol Data Unit (PPDU) over a channel in a frequency band above 45 Ghz, the EDMG PPDU comprising an EDMG Channel Estimation Field (CEF) comprising the first sequence followed by the second sequence, the channel having a channel bandwidth of 6.48 GHz or an integer multiple of 6.48 GHz.

Example 18 includes the subject matter of Example 17, and optionally, wherein the pair of Golay sequences comprises a pair of complementary quasi-phase complex Golay sequences.

Example 19 includes the subject matter of Example 17 or 18, and optionally, wherein the pair of Golay sequences comprises a first Golay sequence formed by a first combination of the values $\{-1, 1, -j, j\}$, and a second Golay sequence formed by a second combination of the values $\{-1, 1, -j, j\}$.

Example 20 includes the subject matter of any one of Examples 17–19, and optionally, wherein the pair of Golay sequences are based on a first vector and a second vector, the first vector comprising a vector [3 24 6 12 48 96 192], the second vector comprising seven elements, each element comprising the value (−1) or (+1).

Example 21 includes the subject matter of Example 20, and optionally, wherein the second vector is based on a spatial stream number of at least one spatial stream to transmit the EDMG PPDU.

Example 22 includes the subject matter of Example 21, and optionally, wherein the second vector, denoted $W_K$, is determined for a spatial stream number as follows:

| Spatial stream number | $W_K$ |
|---|---|
| 1 | [−1, −1, −1, −1, +1, −1, −1] |
| 2 | [−1, −1, −1, −1, +1, −1, −1] |
| 3 | [−1, −1, −1, +1, −1, −1, +1] |
| 4 | [−1, −1, −1, +1, −1, −1, +1] |
| 5 | [−1, −1, −1, +1, −1, +1, +1] |
| 6 | [−1, −1, −1, +1, −1, +1, +1] |
| 7 | [−1, −1, −1, +1, +1, +1, −1] |
| 8 | [−1, −1, −1, +1, +1, +1, −1] |

Example 23 includes the subject matter of any one of Examples 17–22, and optionally, wherein the pair of Golay sequences are based on the following recursive procedure:

$$A_k(n) = W_K A_{k-1}(n) + B_{k-1}(n - D_K)$$

$$B_k(n) W_K A_{k-1}(n) - B_{k-1}(n - D_K)$$

wherein $A_0(n)$ is a function of $Gb_3(n)$, and $B_0(n)$ is a function of $Ga_3(n)$, wherein $Ga_3 = [+1, +1, -1]$, and $Gb_3 = [+1, +j, +1]$, and wherein $D_K$ denotes a vector [3 24 6 12 48 96 192], and $W_K$ denotes a vector based on a spatial stream number.

Example 24 includes the subject matter of any one of Examples 17-23, and optionally, wherein the first sequence comprises a sequence $Gu^i_{1536} = [-Gb^i_{384}, -Ga^i_{384}, +Gb^i_{384}, -Ga^i_{384}]$, and the second sequence comprises a sequence $Gv^i_{1536} = [-Gb^i_{384}, +Ga^i_{384}, -Gb^i_{384}, -Ga^i_{384}]$, wherein $Ga^i_{384}$ denotes a first Golay sequence of the pair of Golay sequences, $Gb^i_{384}$ denotes a second Golay sequence of the pair of Golay sequences, and i denotes a spatial stream number.

Example 25 includes the subject matter of any one of Examples 17-24, and optionally, wherein the EDMG CEF comprises a third sequence following the second sequence, the third sequence comprising a sign inversed Golay sequence of the pair of Golay sequences.

Example 26 includes the subject matter of any one of Examples 17-25, and optionally, wherein the controller is configured to cause the wireless station to modulate the EDMG CEF according to a π/2 Binary Phase-shift keying (BPSK) modulation.

Example 27 includes the subject matter of any one of Examples 17-26, and optionally, wherein the EDMG PPDU comprises a Training (TRN) field comprising at least one of the first sequence or the second sequence.

Example 28 includes the subject matter of any one of Examples 17-27, and optionally, wherein the controller is configured to cause the wireless station to transmit a Single Carrier (SC) transmission comprising the EDMG PPDU.

Example 29 includes the subject matter of any one of Examples 17-27, and optionally, wherein the controller is configured to cause the wireless station to transmit an Orthogonal Frequency Division Multiplexing (OFDM) transmission comprising the EDMG PPDU.

Example 30 includes the subject matter of any one of Examples 17-29, and optionally, wherein the controller is configured to cause the wireless station to transmit a Multiple-Input-Multiple-Output (MIMO) transmission comprising the EDMG PPDU.

Example 31 includes a method to be performed at a wireless station, the method comprising determining a first sequence having a length of 1536 based on a first combination of a pair of Golay sequences, each Golay sequence of the pair of Golay sequences having a length of 384; determining a second sequence having a length of 1536 based on a second combination of the pair of Golay sequences; and transmitting an Enhanced Directional Multi-Gigabit (EDMG) Physical Layer Convergence Protocol (PLCP) Protocol Data Unit (PPDU) over a channel in a frequency band above 45 Ghz, the EDMG PPDU comprising an EDMG Channel Estimation Field (CEF) comprising the first sequence followed by the second sequence, the channel having a channel bandwidth of 6.48 GHz or an integer multiple of 6.48 GHz.

Example 32 includes the subject matter of Example 31, and optionally, wherein the pair of Golay sequences comprises a pair of complementary quasi-phase complex Golay sequences.

Example 33 includes the subject matter of Example 31 or 32, and optionally, wherein the pair of Golay sequences comprises a first Golay sequence formed by a first combination of the values $\{-1, 1, -j, j\}$, and a second Golay sequence formed by a second combination of the values $\{-1, 1, -j, j\}$.

Example 34 includes the subject matter of any one of Examples 31-33, and optionally, wherein the pair of Golay sequences are based on a first vector and a second vector, the first vector comprising a vector [3 24 6 12 48 96 192], the second vector comprising seven elements, each element comprising the value (−1) or (+1).

Example 35 includes the subject matter of Example 34, and optionally, wherein the second vector is based on a spatial stream number of at least one spatial stream to transmit the EDMG PPDU.

Example 36 includes the subject matter of Example 35, and optionally, wherein the second vector, denoted $W_K$, is determined for a spatial stream number as follows:

| Spatial stream number | $W_K$ |
|---|---|
| 1 | [−1, −1, −1, −1, +1, −1, −1] |
| 2 | [−1, −1, −1, −1, +1, −1, −1] |
| 3 | [−1, −1, −1, +1, −1, −1, +1] |
| 4 | [−1, −1, −1, +1, −1, −1, +1] |
| 5 | [−1, −1, −1, +1, −1, +1, +1] |
| 6 | [−1, −1, −1, +1, −1, +1, +1] |
| 7 | [−1, −1, −1, +1, +1, +1, −1] |
| 8 | [−1, −1, −1, +1, +1, +1, −1] |

Example 37 includes the subject matter of any one of Examples 31-36, and optionally, wherein the pair of Golay sequences are based on the following recursive procedure:

$$A_k(n) = W_K A_{k-1}(n) + B_{k-1}(n - D_K)$$

$$B_k(n) W_K A_{k-1}(n) - B_{k-1}(n - D_K)$$

wherein $A_0(n)$ is a function of $Gb_3(n)$, and $B_0(n)$ is a function of $Ga_3(n)$, wherein $Ga_3 = [+1, +1, -1]$, and $Gb_3 = [+1, +j, +1]$, and wherein $D_K$ denotes a vector [3 24 6 12 48 96 192], and $W_K$ denotes a vector based on a spatial stream number.

Example 38 includes the subject matter of any one of Examples 31-37, and optionally, wherein the first sequence comprises a sequence $Gu^i_{1536} = [-Gb^i_{384}, -Ga^i_{384}, +Gb^i_{384}, -Ga^i_{384}]$, and the second sequence comprises a sequence $Gv^i_{1536} = [-Gb^i_{384}, +Ga^i_{384}, -Gb^i_{384}, -Ga^i_{384}]$, wherein $Ga^i_{384}$ denotes a first Golay sequence of the pair of Golay sequences, $Gb^i_{384}$ denotes a second Golay sequence of the pair of Golay sequences, and i denotes a spatial stream number.

Example 39 includes the subject matter of any one of Examples 31-38, and optionally, wherein the EDMG CEF comprises a third sequence following the second sequence, the third sequence comprising a sign inversed Golay sequence of the pair of Golay sequences.

Example 40 includes the subject matter of any one of Examples 31-39, and optionally, comprising modulating the EDMG CEF according to a π/2 Binary Phase-shift keying (BPSK) modulation.

Example 41 includes the subject matter of any one of Examples 31-40, and optionally, wherein the EDMG PPDU comprises a Training (TRN) field comprising at least one of the first sequence or the second sequence.

Example 42 includes the subject matter of any one of Examples 31-41, and optionally, comprising transmitting a Single Carrier (SC) transmission comprising the EDMG PPDU.

Example 43 includes the subject matter of any one of Examples 31-41, and optionally, comprising transmitting an Orthogonal Frequency Division Multiplexing (OFDM) transmission comprising the EDMG PPDU.

Example 44 includes the subject matter of any one of Examples 31-43, and optionally, comprising transmitting a Multiple-Input-Multiple-Output (MIMO) transmission comprising the EDMG PPDU.

Example 45 includes a product comprising one or more tangible computer-readable non-transitory storage media comprising computer-executable instructions operable to, when executed by at least one processor, enable the at least one processor to cause a wireless station to determine a first sequence having a length of 1536 based on a first combination of a pair of Golay sequences, each Golay sequence of the pair of Golay sequences having a length of 384; determine a second sequence having a length of 1536 based on a second combination of the pair of Golay sequences; and transmit an Enhanced Directional Multi-Gigabit (EDMG) Physical Layer Convergence Protocol (PLCP) Protocol Data Unit (PPDU) over a channel in a frequency band above 45 Ghz, the EDMG PPDU comprising an EDMG Channel Estimation Field (CEF) comprising the first sequence followed by the second sequence, the channel having a channel bandwidth of 6.48 GHz or an integer multiple of 6.48 GHz.

Example 46 includes the subject matter of Example 45, and optionally, wherein the pair of Golay sequences comprises a pair of complementary quasi-phase complex Golay sequences.

Example 47 includes the subject matter of Example 45 or 46, and optionally, wherein the pair of Golay sequences comprises a first Golay sequence formed by a first combination of the values {−1, 1, −j, j}, and a second Golay sequence formed by a second combination of the values {−1, 1, −j, j}.

Example 48 includes the subject matter of any one of Examples 45-47, and optionally, wherein the pair of Golay sequences are based on a first vector and a second vector, the first vector comprising a vector [3 24 6 12 48 96 192], the second vector comprising seven elements, each element comprising the value (−1) or (+1).

Example 49 includes the subject matter of Example 48, and optionally, wherein the second vector is based on a spatial stream number of at least one spatial stream to transmit the EDMG PPDU.

Example 50 includes the subject matter of Example 49, and optionally, wherein the second vector, denoted $W_K$, is determined for a spatial stream number as follows:

| Spatial stream number | $W_K$ |
|---|---|
| 1 | [−1, −1, −1, −1, +1, −1, −1] |
| 2 | [−1, −1, −1, −1, +1, −1, −1] |
| 3 | [−1, −1, −1, +1, −1, −1, +1] |
| 4 | [−1, −1, −1, +1, −1, −1, +1] |
| 5 | [−1, −1, −1, +1, −1, +1, +1] |
| 6 | [−1, −1, −1, +1, −1, +1, +1] |
| 7 | [−1, −1, −1, +1, +1, +1, −1] |
| 8 | [−1, −1, −1, +1, +1, +1, −1] |

Example 51 includes the subject matter of any one of Examples 45-50, and optionally, wherein the pair of Golay sequences are based on the following recursive procedure:

$$A_k(n) = W_K A_{k-1}(n) + B_{k-1}(n - D_K)$$

$$B_k(n) W_K A_{k-1}(n) - B_{k-1}(n - D_K)$$

wherein $A_0(n)$ is a function of $Gb_3(n)$, and $B_0(n)$ is a function of $Ga_3(n)$, wherein $Ga_3 = [+1, +1, -1]$, and $Gb_3 = [+1, +j, +1]$, and wherein $D_K$ denotes a vector [3 24 6 12 48 96 192], and $W_K$ denotes a vector based on a spatial stream number.

Example 52 includes the subject matter of any one of Examples 45-51, and optionally, wherein the first sequence comprises a sequence $Gu^i_{1536} = [-Gb^i_{384}, -Ga^i_{384}, +Gb^i_{384}, -Ga^i_{384}]$, and the second sequence comprises a sequence $Gv^i_{1536}=[-Gb^i_{384}, +Ga^i_{384}, -Gb^i_{384}, -Ga^i_{384}]$, wherein $Ga^i_{384}$ denotes a first Golay sequence of the pair of Golay sequences, $Gb^i_{384}$ denotes a second Golay sequence of the pair of Golay sequences, and i denotes a spatial stream number.

Example 53 includes the subject matter of any one of Examples 45-52, and optionally, wherein the EDMG CEF comprises a third sequence following the second sequence, the third sequence comprising a sign inversed Golay sequence of the pair of Golay sequences.

Example 54 includes the subject matter of any one of Examples 45-53, and optionally, wherein the instructions, when executed, cause the wireless station to modulate the EDMG CEF according to a π/2 Binary Phase-shift keying (BPSK) modulation.

Example 55 includes the subject matter of any one of Examples 45-54, and optionally, wherein the EDMG PPDU comprises a Training (TRN) field comprising at least one of the first sequence or the second sequence.

Example 56 includes the subject matter of any one of Examples 45-55, and optionally, wherein the instructions, when executed, cause the wireless station to transmit a Single Carrier (SC) transmission comprising the EDMG PPDU.

Example 57 includes the subject matter of any one of Examples 45-55, and optionally, wherein the instructions, when executed, cause the wireless station to transmit an Orthogonal Frequency Division Multiplexing (OFDM) transmission comprising the EDMG PPDU.

Example 58 includes the subject matter of any one of Examples 45-57, and optionally, wherein the instructions, when executed, cause the wireless station to transmit a Multiple-Input-Multiple-Output (MIMO) transmission comprising the EDMG PPDU.

Example 59 includes an apparatus of wireless communication by a wireless station, the apparatus comprising means for determining a first sequence having a length of 1536 based on a first combination of a pair of Golay sequences, each Golay sequence of the pair of Golay sequences having a length of 384; means for determining a second sequence having a length of 1536 based on a second combination of the pair of Golay sequences; and means for transmitting an Enhanced Directional Multi-Gigabit (EDMG) Physical Layer Convergence Protocol (PLCP) Protocol Data Unit (PPDU) over a channel in a frequency band above 45 Ghz, the EDMG PPDU comprising an EDMG Channel Estimation Field (CEF) comprising the first sequence followed by the second sequence, the channel having a channel bandwidth of 6.48 GHz or an integer multiple of 6.48 GHz.

Example 60 includes the subject matter of Example 59, and optionally, wherein the pair of Golay sequences comprises a pair of complementary quasi-phase complex Golay sequences.

Example 61 includes the subject matter of Example 59 or 60, and optionally, wherein the pair of Golay sequences comprises a first Golay sequence formed by a first combination of the values {−1, 1, −j, j}, and a second Golay sequence formed by a second combination of the values {−1, 1, −j, j}.

Example 62 includes the subject matter of any one of Examples 59-61, and optionally, wherein the pair of Golay sequences are based on a first vector and a second vector, the first vector comprising a vector [3 24 6 12 48 96 192], the second vector comprising seven elements, each element comprising the value (−1) or (+1).

Example 63 includes the subject matter of Example 62, and optionally, wherein the second vector is based on a spatial stream number of at least one spatial stream to transmit the EDMG PPDU.

Example 64 includes the subject matter of Example 63, and optionally, wherein the second vector, denoted $W_K$, is determined for a spatial stream number as follows:

| Spatial stream number | $W_K$ |
| --- | --- |
| 1 | [−1, −1, −1, −1, +1, −1, −1] |
| 2 | [−1, −1, −1, −1, +1, −1, −1] |
| 3 | [−1, −1, −1, +1, −1, −1, +1] |
| 4 | [−1, −1, −1, +1, −1, −1, +1] |
| 5 | [−1, −1, −1, +1, −1, +1, +1] |
| 6 | [−1, −1, −1, +1, −1, +1, +1] |
| 7 | [−1, −1, −1, +1, +1, +1, −1] |
| 8 | [−1, −1, −1, +1, +1, +1, −1] |

Example 65 includes the subject matter of any one of Examples 59-64, and optionally, wherein the pair of Golay sequences are based on the following recursive procedure:

$$A_k(n)=W_K A_{k-1}(n)+B_{k-1}(n-D_K)$$

$$B_k(n) W_K A_{k-1}(n)-B_{k-1}(n-D_k)$$

wherein $A_0(n)$ is a function of $Gb_3(n)$, and $B_0(n)$ is a function of $Ga_3(n)$, wherein $Ga_3=[+1, +1, −1]$, and $Gb_3=[+1, +j, +1]$, and wherein $D_K$ denotes a vector [3 24 6 12 48 96 192], and $W_K$ denotes a vector based on a spatial stream number.

Example 66 includes the subject matter of any one of Examples 59-65, and optionally, wherein the first sequence comprises a sequence $Gu^i_{1536}=[-Gb^i_{384}, -Ga^i_{384}, +Gb^i_{384}, -Ga^i_{384}]$, and the second sequence comprises a sequence $Gv^i_{1536}=[-Gb^i_{384}, +Ga^i_{384}, -Gb^i_{384}, -Ga^i_{384}]$, wherein $Ga^i_{384}$ denotes a first Golay sequence of the pair of Golay sequences, $Gb^i_{384}$ denotes a second Golay sequence of the pair of Golay sequences, and i denotes a spatial stream number.

Example 67 includes the subject matter of any one of Examples 59-66, and optionally, wherein the EDMG CEF comprises a third sequence following the second sequence, the third sequence comprising a sign inversed Golay sequence of the pair of Golay sequences.

Example 68 includes the subject matter of any one of Examples 59-67, and optionally, comprising means for modulating the EDMG CEF according to a π/2 Binary Phase-shift keying (BPSK) modulation.

Example 69 includes the subject matter of any one of Examples 59-68, and optionally, wherein the EDMG PPDU comprises a Training (TRN) field comprising at least one of the first sequence or the second sequence.

Example 70 includes the subject matter of any one of Examples 59-69, and optionally, comprising means for transmitting a Single Carrier (SC) transmission comprising the EDMG PPDU.

Example 71 includes the subject matter of any one of Examples 59-69, and optionally, comprising means for transmitting an Orthogonal Frequency Division Multiplexing (OFDM) transmission comprising the EDMG PPDU.

Example 72 includes the subject matter of any one of Examples 59-71, and optionally, comprising means for transmitting a Multiple-Input-Multiple-Output (MIMO) transmission comprising the EDMG PPDU.

Example 73 includes an apparatus comprising logic and circuitry configured to cause a first wireless station to receive an Enhanced Directional Multi-Gigabit (EDMG)

Physical Layer Convergence Protocol (PLCP) Protocol Data Unit (PPDU) from a second wireless station over a channel in a frequency band above 45 Ghz, the channel having a channel bandwidth of 6.48 GHz or an integer multiple of 6.48 GHz, the EDMG PPDU comprising an EDMG Channel Estimation Field (CEF); determine a channel estimation between the first and second wireless stations by processing the EDMG CEF according to an EDMG CEF structure comprising a first sequence followed by a second sequence, the first sequence having a length of 1536 and is based on a first combination of a pair of Golay sequences, each Golay sequence of the pair of Golay sequences having a length of 384, the second sequence having a length of 1536 and is based on a second combination of the pair of Golay sequences; and process a communication with the second wireless station based on the channel estimation.

Example 74 includes the subject matter of Example 73, and optionally, wherein the pair of Golay sequences comprises a pair of complementary quasi-phase complex Golay sequences.

Example 75 includes the subject matter of Example 73 or 74, and optionally, wherein the pair of Golay sequences comprises a first Golay sequence formed by a first combination of the values $\{-1, 1, -j, j\}$, and a second Golay sequence formed by a second combination of the values $\{-1, 1, -j, j\}$.

Example 76 includes the subject matter of any one of Examples 73-75, and optionally, wherein the pair of Golay sequences are based on a first vector and a second vector, the first vector comprising a vector [3 24 6 12 48 96 192], the second vector comprising seven elements, each element comprising the value (−1) or (+1).

Example 77 includes the subject matter of Example 76, and optionally, wherein the second vector is based on a spatial stream number of at least one spatial stream to transmit the EDMG PPDU.

Example 78 includes the subject matter of Example 77, and optionally, wherein the second vector, denoted $W_K$, is determined for a spatial stream number as follows:

| Spatial stream number | $W_K$ |
|---|---|
| 1 | [−1, −1, −1, −1, +1, −1, −1] |
| 2 | [−1, −1, −1, −1, +1, −1, −1] |
| 3 | [−1, −1, −1, +1, −1, −1, +1] |
| 4 | [−1, −1, −1, +1, −1, −1, +1] |
| 5 | [−1, −1, −1, +1, −1, +1, +1] |
| 6 | [−1, −1, −1, +1, −1, +1, +1] |
| 7 | [−1, −1, −1, +1, +1, +1, −1] |
| 8 | [−1, −1, −1, +1, +1, +1, −1] |

Example 79 includes the subject matter of any one of Examples 73-78, and optionally, wherein the pair of Golay sequences are based on the following recursive procedure:

$$A_k(n) = W_K A_{k-1}(n) + B_{k-1}(n-D_K)$$

$$B_k(n) W_K A_{k-1}(n) - B_{k-1}(n-D_k)$$

wherein $A_0(n)$ is a function of $Gb_3(n)$, and $B_0(n)$ is a function of $Ga_3(n)$, wherein $Ga_3 = [+1, +1, −1]$, and $Gb_3 = [+1, +j, +1]$, and wherein $D_K$ denotes a vector [3 24 6 12 48 96 192], and $W_K$ denotes a vector based on a spatial stream number.

Example 80 includes the subject matter of any one of Examples 73-79, and optionally, wherein the first sequence comprises a sequence $Gu^i_{1536} = [-Gb^i_{384}, -Ga^i_{384}, +Gb^i_{384}, -Ga^i_{384}]$, and the second sequence comprises a sequence $Gv^i_{1536} = [-Gb^i_{384}, +Ga^i_{384}, -Gb^i_{384}, -Ga^i_{384}]$, wherein $Ga^i_{384}$ denotes a first Golay sequence of the pair of Golay sequences, $Gb^i_{384}$ denotes a second Golay sequence of the pair of Golay sequences, and i denotes a spatial stream number.

Example 81 includes the subject matter of any one of Examples 73-80, and optionally, wherein the EDMG CEF structure comprises a third sequence following the second sequence, the third sequence comprising a sign inversed Golay sequence of the pair of Golay sequences.

Example 82 includes the subject matter of any one of Examples 73-81, and optionally, wherein the apparatus is configured to cause the first wireless station to demodulate the EDMG CEF according to a it/2 Binary Phase-shift keying (BPSK) modulation.

Example 83 includes the subject matter of any one of Examples 73-82, and optionally, wherein the apparatus is configured to cause the first wireless station to process a Training (TRN) field of the EDMG based on at least one of the first sequence or the second sequence.

Example 84 includes the subject matter of any one of Examples 73-83, and optionally, wherein the apparatus is configured to cause the first wireless station to receive a Single Carrier (SC) transmission comprising the EDMG PPDU.

Example 85 includes the subject matter of any one of Examples 73-83, and optionally, wherein the apparatus is configured to cause the first wireless station to receive an Orthogonal Frequency Division Multiplexing (OFDM) transmission comprising the EDMG PPDU.

Example 86 includes the subject matter of any one of Examples 73-85, and optionally, wherein the apparatus is configured to cause the first wireless station to receive a Multiple-Input-Multiple-Output (MIMO) transmission comprising the EDMG PPDU.

Example 87 includes the subject matter of any one of Examples 73-86, and optionally, comprising a radio to receive the EDMG PPDU.

Example 88 includes the subject matter of any one of Examples 73-87, and optionally, comprising one or more antennas, a memory, and a processor.

Example 89 includes a system of wireless communication comprising a first wireless station, the first wireless station comprising one or more antennas; a radio; a memory; a processor; and a controller configured to cause the first wireless station to receive an Enhanced Directional Multi-Gigabit (EDMG) Physical Layer Convergence Protocol (PLCP) Protocol Data Unit (PPDU) from a second wireless station over a channel in a frequency band above 45 Ghz, the channel having a channel bandwidth of 6.48 GHz or an integer multiple of 6.48 GHz, the EDMG PPDU comprising an EDMG Channel Estimation Field (CEF); determine a channel estimation between the first and second wireless stations by processing the EDMG CEF according to an EDMG CEF structure comprising a first sequence followed by a second sequence, the first sequence having a length of 1536 and is based on a first combination of a pair of Golay sequences, each Golay sequence of the pair of Golay sequences having a length of 384, the second sequence having a length of 1536 and is based on a second combination of the pair of Golay sequences; and process a communication with the second wireless station based on the channel estimation.

Example 90 includes the subject matter of Example 89, and optionally, wherein the pair of Golay sequences comprises a pair of complementary quasi-phase complex Golay sequences.

Example 91 includes the subject matter of Example 89 or 90, and optionally, wherein the pair of Golay sequences comprises a first Golay sequence formed by a first combination of the values {−1, 1, −j, j}, and a second Golay sequence formed by a second combination of the values {−1, 1, −j, j}.

Example 92 includes the subject matter of any one of Examples 89-91, and optionally, wherein the pair of Golay sequences are based on a first vector and a second vector, the first vector comprising a vector [3 24 6 12 48 96 192], the second vector comprising seven elements, each element comprising the value (−1) or (+1).

Example 93 includes the subject matter of Example 92, and optionally, wherein the second vector is based on a spatial stream number of at least one spatial stream to transmit the EDMG PPDU.

Example 94 includes the subject matter of Example 93, and optionally, wherein the second vector, denoted $W_K$, is determined for a spatial stream number as follows:

| Spatial stream number | $W_K$ |
|---|---|
| 1 | [−1, −1, −1, −1, +1, −1, −1] |
| 2 | [−1, −1, −1, −1, +1, −1, −1] |
| 3 | [−1, −1, −1, +1, −1, −1, +1] |
| 4 | [−1, −1, −1, +1, −1, −1, +1] |
| 5 | [−1, −1, −1, +1, −1, +1, +1] |
| 6 | [−1, −1, −1, +1, −1, +1, +1] |
| 7 | [−1, −1, −1, +1, +1, +1, −1] |
| 8 | [−1, −1, −1, +1, +1, +1, −1] |

Example 95 includes the subject matter of any one of Examples 89-94, and optionally, wherein the pair of Golay sequences are based on the following recursive procedure:

$$A_k(n) = W_K A_{k-1}(n) + B_{k-1}(n-D_K)$$

$$B_k(n) W_K A_{k-1}(n) - B_{k-1}(n-D_k)$$

wherein $A_0(n)$ is a function of $Gb_3(n)$, and $B_0(n)$ is a function of $Ga_3(n)$, wherein $Ga_3 = [+1, +1, −1]$, and $Gb_3 = [+1, +j, +1]$, and wherein $D_K$ denotes a vector [3 24 6 12 48 96 192], and $W_K$ denotes a vector based on a spatial stream number.

Example 96 includes the subject matter of any one of Examples 89-95, and optionally, wherein the first sequence comprises a sequence $Gu^i_{1536}$ [$-Gb^i_{384}$, $-Ga^i_{384}$, $+Gb^i_{384}$, $-Ga^i_{384}$], and the second sequence comprises a sequence $Gv^i_{1536} = [-Gb^i_{384}, +Ga^i_{384}, -Gb^i_{384}, -Ga^i_{384}]$, wherein $Ga^i_{384}$ denotes a first Golay sequence of the pair of Golay sequences, $Gb^i_{384}$ denotes a second Golay sequence of the pair of Golay sequences, and i denotes a spatial stream number.

Example 97 includes the subject matter of any one of Examples 89-96, and optionally, wherein the EDMG CEF structure comprises a third sequence following the second sequence, the third sequence comprising a sign inversed Golay sequence of the pair of Golay sequences.

Example 98 includes the subject matter of any one of Examples 89-97, and optionally, wherein the controller is configured to cause the first wireless station to demodulate the EDMG CEF according to a π/2 Binary Phase-shift keying (BPSK) modulation.

Example 99 includes the subject matter of any one of Examples 89-98, and optionally, wherein the controller is configured to cause the first wireless station to process a Training (TRN) field of the EDMG based on at least one of the first sequence or the second sequence.

Example 100 includes the subject matter of any one of Examples 89-99, and optionally, wherein the controller is configured to cause the first wireless station to receive a Single Carrier (SC) transmission comprising the EDMG PPDU.

Example 101 includes the subject matter of any one of Examples 89-99, and optionally, wherein the controller is configured to cause the first wireless station to receive an Orthogonal Frequency Division Multiplexing (OFDM) transmission comprising the EDMG PPDU.

Example 102 includes the subject matter of any one of Examples 89-101, and optionally, wherein the controller is configured to cause the first wireless station to receive a Multiple-Input-Multiple-Output (MIMO) transmission comprising the EDMG PPDU.

Example 103 includes a method to be performed at a first wireless station, the method comprising receiving an Enhanced Directional Multi-Gigabit (EDMG) Physical Layer Convergence Protocol (PLCP) Protocol Data Unit (PPDU) from a second wireless station over a channel in a frequency band above 45 Ghz, the channel having a channel bandwidth of 6.48 GHz or an integer multiple of 6.48 GHz, the EDMG PPDU comprising an EDMG Channel Estimation Field (CEF); determining a channel estimation between the first and second wireless stations by processing the EDMG CEF according to an EDMG CEF structure comprising a first sequence followed by a second sequence, the first sequence having a length of 1536 and is based on a first combination of a pair of Golay sequences, each Golay sequence of the pair of Golay sequences having a length of 384, the second sequence having a length of 1536 and is based on a second combination of the pair of Golay sequences; and processing a communication with the second wireless station based on the channel estimation.

Example 104 includes the subject matter of Example 103, and optionally, wherein the pair of Golay sequences comprises a pair of complementary quasi-phase complex Golay sequences.

Example 105 includes the subject matter of Example 103 or 104, and optionally, wherein the pair of Golay sequences comprises a first Golay sequence formed by a first combination of the values {−1, 1, −j, j}, and a second Golay sequence formed by a second combination of the values {−1, 1, −j, j}.

Example 106 includes the subject matter of any one of Examples 103-105, and optionally, wherein the pair of Golay sequences are based on a first vector and a second vector, the first vector comprising a vector [3 24 6 12 48 96 192], the second vector comprising seven elements, each element comprising the value (−1) or (+1).

Example 107 includes the subject matter of Example 106, and optionally, wherein the second vector is based on a spatial stream number of at least one spatial stream to transmit the EDMG PPDU.

Example 108 includes the subject matter of Example 107, and optionally, wherein the second vector, denoted $W_K$, is determined for a spatial stream number as follows:

| Spatial stream number | $W_K$ |
|---|---|
| 1 | [−1, −1, −1, −1, +1, −1, −1] |
| 2 | [−1, −1, −1, −1, +1, −1, −1] |
| 3 | [−1, −1, −1, +1, −1, −1, +1] |
| 4 | [−1, −1, −1, +1, −1, −1, +1] |
| 5 | [−1, −1, −1, +1, −1, +1, +1] |
| 6 | [−1, −1, −1, +1, −1, +1, +1] |

-continued

| Spatial stream number | $W_K$ |
|---|---|
| 7 | [−1, −1, −1, +1, +1, +1, −1] |
| 8 | [−1, −1, −1, +1, +1, +1, −1] |

Example 109 includes the subject matter of any one of Examples 103–108, and optionally, wherein the pair of Golay sequences are based on the following recursive procedure:

$$A_k(n) = W_K A_{k-1}(n) + B_{k-1}(n-D_K)$$

$$B_k(n) W_K A_{k-1}(n) - B_{k-1}(n-D_K)$$

wherein $A_0(n)$ is a function of $Gb_3(n)$, and $B_0(n)$ is a function of $Ga_3(n)$, wherein $Ga_3 = [+1, +1, −1]$, and $Gb_3 = [+1, +j, +1]$, and wherein $D_K$ denotes a vector [3 24 6 12 48 96 192], and $W_K$ denotes a vector based on a spatial stream number.

Example 110 includes the subject matter of any one of Examples 103–109, and optionally, wherein the first sequence comprises a sequence $Gu^i_{1536} = [-Gb^i_{384}, -Ga^i_{384}, +Gb^i_{384}, -Ga^i_{384}]$, and the second sequence comprises a sequence $Gv^i_{1536} = [-Gb^i_{384}, +Ga^i_{384}, -Gb^i_{384}, -Ga^i_{384}]$, wherein $Ga^i_{384}$ denotes a first Golay sequence of the pair of Golay sequences, $Gb^i_{384}$ denotes a second Golay sequence of the pair of Golay sequences, and i denotes a spatial stream number.

Example 111 includes the subject matter of any one of Examples 103–110, and optionally, wherein the EDMG CEF structure comprises a third sequence following the second sequence, the third sequence comprising a sign inversed Golay sequence of the pair of Golay sequences.

Example 112 includes the subject matter of any one of Examples 103–111, and optionally, comprising demodulating the EDMG CEF according to a π/2 Binary Phase-shift keying (BPSK) modulation.

Example 113 includes the subject matter of any one of Examples 103-112, and optionally, comprising processing a Training (TRN) field of the EDMG based on at least one of the first sequence or the second sequence.

Example 114 includes the subject matter of any one of Examples 103-113, and optionally, comprising receiving a Single Carrier (SC) transmission comprising the EDMG PPDU.

Example 115 includes the subject matter of any one of Examples 103-113, and optionally, comprising receiving an Orthogonal Frequency Division Multiplexing (OFDM) transmission comprising the EDMG PPDU.

Example 116 includes the subject matter of any one of Examples 103-115, and optionally, comprising receiving a Multiple-Input-Multiple-Output (MIMO) transmission comprising the EDMG PPDU.

Example 117 includes a product comprising one or more tangible computer-readable non-transitory storage media comprising computer-executable instructions operable to, when executed by at least one processor, enable the at least one processor to cause a first wireless station to receive an Enhanced Directional Multi-Gigabit (EDMG) Physical Layer Convergence Protocol (PLCP) Protocol Data Unit (PPDU) from a second wireless station over a channel in a frequency band above 45 Ghz, the channel having a channel bandwidth of 6.48 GHz or an integer multiple of 6.48 GHz, the EDMG PPDU comprising an EDMG Channel Estimation Field (CEF); determine a channel estimation between the first and second wireless stations by processing the EDMG CEF according to an EDMG CEF structure comprising a first sequence followed by a second sequence, the first sequence having a length of 1536 and is based on a first combination of a pair of Golay sequences, each Golay sequence of the pair of Golay sequences having a length of 384, the second sequence having a length of 1536 and is based on a second combination of the pair of Golay sequences; and process a communication with the second wireless station based on the channel estimation.

Example 118 includes the subject matter of Example 117, and optionally, wherein the pair of Golay sequences comprises a pair of complementary quasi-phase complex Golay sequences.

Example 119 includes the subject matter of Example 117 or 118, and optionally, wherein the pair of Golay sequences comprises a first Golay sequence formed by a first combination of the values {−1, 1, −j, j}, and a second Golay sequence formed by a second combination of the values {−1, 1, −j, j}.

Example 120 includes the subject matter of any one of Examples 117-119, and optionally, wherein the pair of Golay sequences are based on a first vector and a second vector, the first vector comprising a vector [3 24 6 12 48 96 192], the second vector comprising seven elements, each element comprising the value (−1) or (+1).

Example 121 includes the subject matter of Example 120, and optionally, wherein the second vector is based on a spatial stream number of at least one spatial stream to transmit the EDMG PPDU.

Example 122 includes the subject matter of Example 121, and optionally, wherein the second vector, denoted $W_K$, is determined for a spatial stream number as follows:

| Spatial stream number | $W_K$ |
|---|---|
| 1 | [−1, −1, −1, −1, +1, −1, −1] |
| 2 | [−1, −1, −1, −1, +1, −1, −1] |
| 3 | [−1, −1, −1, +1, −1, −1, +1] |
| 4 | [−1, −1, −1, +1, −1, −1, +1] |
| 5 | [−1, −1, −1, +1, −1, +1, +1] |
| 6 | [−1, −1, −1, +1, −1, +1, +1] |
| 7 | [−1, −1, −1, +1, +1, +1, −1] |
| 8 | [−1, −1, −1, +1, +1, +1, −1] |

Example 123 includes the subject matter of any one of Examples 117-122, and optionally, wherein the pair of Golay sequences are based on the following recursive procedure:

$$A_k(n) = W_K A_{k-1}(n) + B_{k-1}(n-D_K)$$

$$B_k(n) W_K A_{k-1}(n) - B_{k-1}(n-D_K)$$

wherein $A_0(n)$ is a function of $Gb_3(n)$, and $B_0(n)$ is a function of $Ga_3(n)$, wherein $Ga_3 = [+1, +1, −1]$, and $Gb_3 = [+1, +j, +1]$, and wherein $D_K$ denotes a vector [3 24 6 12 48 96 192], and $W_K$ denotes a vector based on a spatial stream number.

Example 124 includes the subject matter of any one of Examples 117-123, and optionally, wherein the first sequence comprises a sequence $Gu^i_{1536} = [-Gb^i_{384}, -Ga^i_{384}, +Gb^i_{384}, -Ga^i_{384}]$, and the second sequence comprises a sequence $Gv^i_{1536} = [-Gb^i_{384}, +Ga^i_{384}, -Gb^i_{384}, -Ga^i_{384}]$, wherein $Ga^i_{384}$ denotes a first Golay sequence of the pair of Golay sequences, $Gb^i_{384}$ denotes a second Golay sequence of the pair of Golay sequences, and i denotes a spatial stream number.

Example 125 includes the subject matter of any one of Examples 117-124, and optionally, wherein the EDMG CEF structure comprises a third sequence following the second sequence, the third sequence comprising a sign inversed Golay sequence of the pair of Golay sequences.

Example 126 includes the subject matter of any one of Examples 117-125, and optionally, wherein the instructions, when executed, cause the first wireless station to demodulate the EDMG CEF according to a π/2 Binary Phase-shift keying (BPSK) modulation.

Example 127 includes the subject matter of any one of Examples 117–126, and optionally, wherein the instructions, when executed, cause the first wireless station to process a Training (TRN) field of the EDMG based on at least one of the first sequence or the second sequence.

Example 128 includes the subject matter of any one of Examples 117-127, and optionally, wherein the instructions, when executed, cause the first wireless station to receive a Single Carrier (SC) transmission comprising the EDMG PPDU.

Example 129 includes the subject matter of any one of Examples 117–127, and optionally, wherein the instructions, when executed, cause the first wireless station to receive an Orthogonal Frequency Division Multiplexing (OFDM) transmission comprising the EDMG PPDU.

Example 130 includes the subject matter of any one of Examples 117–129, and optionally, wherein the instructions, when executed, cause the first wireless station to receive a Multiple-Input-Multiple-Output (MIMO) transmission comprising the EDMG PPDU.

Example 131 includes an apparatus of wireless communication by a first wireless station, the apparatus comprising means for receiving an Enhanced Directional Multi-Gigabit (EDMG) Physical Layer Convergence Protocol (PLCP) Protocol Data Unit (PPDU) from a second wireless station over a channel in a frequency band above 45 Ghz, the channel having a channel bandwidth of 6.48 GHz or an integer multiple of 6.48 GHz, the EDMG PPDU comprising an EDMG Channel Estimation Field (CEF); means for determining a channel estimation between the first and second wireless stations by processing the EDMG CEF according to an EDMG CEF structure comprising a first sequence followed by a second sequence, the first sequence having a length of 1536 and is based on a first combination of a pair of Golay sequences, each Golay sequence of the pair of Golay sequences having a length of 384, the second sequence having a length of 1536 and is based on a second combination of the pair of Golay sequences; and means for processing a communication with the second wireless station based on the channel estimation.

Example 132 includes the subject matter of Example 131, and optionally, wherein the pair of Golay sequences comprises a pair of complementary quasi-phase complex Golay sequences.

Example 133 includes the subject matter of Example 131 or 132, and optionally, wherein the pair of Golay sequences comprises a first Golay sequence formed by a first combination of the values {−1, 1, −j, j}, and a second Golay sequence formed by a second combination of the values {−1, 1, −j, j}.

Example 134 includes the subject matter of any one of Examples 131–133, and optionally, wherein the pair of Golay sequences are based on a first vector and a second vector, the first vector comprising a vector [3 24 6 12 48 96 192], the second vector comprising seven elements, each element comprising the value (−1) or (+1).

Example 135 includes the subject matter of Example 134, and optionally, wherein the second vector is based on a spatial stream number of at least one spatial stream to transmit the EDMG PPDU.

Example 136 includes the subject matter of Example 135, and optionally, wherein the second vector, denoted $W_K$, is determined for a spatial stream number as follows:

| Spatial stream number | $W_K$ |
|---|---|
| 1 | [−1, −1, −1, −1, +1, −1, −1] |
| 2 | [−1, −1, −1, −1, +1, −1, −1] |
| 3 | [−1, −1, −1, +1, −1, −1, +1] |
| 4 | [−1, −1, −1, +1, −1, −1, +1] |
| 5 | [−1, −1, −1, +1, −1, +1, +1] |
| 6 | [−1, −1, −1, +1, −1, +1, +1] |
| 7 | [−1, −1, −1, +1, +1, +1, −1] |
| 8 | [−1, −1, −1, +1, +1, +1, −1] |

Example 137 includes the subject matter of any one of Examples 131–136, and optionally, wherein the pair of Golay sequences are based on the following recursive procedure:

$$A_k(n) = W_K A_{k-1}(n) + B_{k-1}(n - D_K)$$

$$B_k(n) W_K A_{k-1}(n) - B_{k-1}(n - D_k)$$

wherein $A_0(n)$ is a function of $Gb_3(n)$, and $B_0(n)$ is a function of $Ga_3(n)$, wherein $Ga_3 = [+1, +1, -1]$, and $Gb_3 = [+1, +j, +1]$, and wherein $D_K$ denotes a vector [3 24 6 12 48 96 192], and $W_K$ denotes a vector based on a spatial stream number.

Example 138 includes the subject matter of any one of Examples 131–137, and optionally, wherein the first sequence comprises a sequence $Gu^i_{1536} = [-Gb^i_{384}, -Ga^i_{384}, +Gb^i_{384}, -Ga^i_{384}]$, and the second sequence comprises a sequence $Gv^i_{1536} = [-Gb^i_{384}, +Ga^i_{384}, -Gb^i_{384}, -Ga^i_{384}]$, wherein $Ga^i_{384}$ denotes a first Golay sequence of the pair of Golay sequences, $Gb^i_{384}$ denotes a second Golay sequence of the pair of Golay sequences, and i denotes a spatial stream number.

Example 139 includes the subject matter of any one of Examples 131-138, and optionally, wherein the EDMG CEF structure comprises a third sequence following the second sequence, the third sequence comprising a sign inversed Golay sequence of the pair of Golay sequences.

Example 140 includes the subject matter of any one of Examples 131-139, and optionally, comprising means for demodulating the EDMG CEF according to a π/2 Binary Phase-shift keying (BPSK) modulation.

Example 141 includes the subject matter of any one of Examples 131-140, and optionally, comprising means for processing a Training (TRN) field of the EDMG based on at least one of the first sequence or the second sequence.

Example 142 includes the subject matter of any one of Examples 131-141, and optionally, comprising means for receiving a Single Carrier (SC) transmission comprising the EDMG PPDU.

Example 143 includes the subject matter of any one of Examples 131-141, and optionally, comprising means for receiving an Orthogonal Frequency Division Multiplexing (OFDM) transmission comprising the EDMG PPDU.

Example 144 includes the subject matter of any one of Examples 131-143, and optionally, comprising means for receiving a Multiple-Input-Multiple-Output (MIMO) transmission comprising the EDMG PPDU.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
   memory circuitry; and
   a processor comprising logic and circuitry configured to cause an Enhanced Directional Multi-Gigabit (EDMG) wireless communication station (STA) to:
      generate a pair of Golay complementary sequences of length 384 by performing a plurality of iterations of a recursive procedure based on a complex Golay complementary pair of length 3;
      generate an EDMG field of an EDMG Physical Layer (PHY) Protocol Data Unit (PPDU) based on the pair of Golay complementary sequences of length 384; and
      transmit the EDMG PPDU over a channel bandwidth of 6.48 Gigahertz (GHz).

2. The apparatus of claim 1, wherein the complex Golay complementary pair of length 3 comprises a Golay sequence Ga3=[+j, +1, −1], and a Golay sequence Gb3=[+1, +j, +1].

3. The apparatus of claim 1, wherein the recursive procedure is based on a vector Dk=[3 24 6 12 48 96 192].

4. The apparatus of claim 1, wherein the recursive procedure is based on a vector Wk, which is based on an index corresponding to the EDMG field.

5. The apparatus of claim 4, wherein the vector Wk is defined based on the index as follows:

| index | $W_k$ |
|---|---|
| 1 | [−1, −1, −1, −1, +1, −1, −1] |
| 2 | [−1, −1, −1, −1, +1, −1, −1] |
| 3 | [−1, −1, −1, +1, −1, −1, +1] |
| 4 | [−1, −1, −1, +1, −1, −1, +1] |
| 5 | [−1, −1, −1, +1, −1, +1, +1] |
| 6 | [−1, −1, −1, +1, −1, +1, +1] |
| 7 | [−1, −1, −1, +1, +1, +1, −1] |
| 8 | [−1, −1, −1, +1, +1, +1, −1]. |

6. The apparatus of claim 4, wherein the index comprises a stream number.

7. The apparatus of claim 1 configured to generate the pair of Golay complementary sequences of length 384 comprising a first Golay sequence $Ga_{384}(n)=conj(A_7(383-n))$, and a second Golay sequence $Gb_{384}(n)=conj(B_7(383-n))$, by performing seven iterations according to the following recursive procedure:

$$A_k(n)=W_K A_{k-1}(n)+B_{k-1}(n-D_K)$$

$$B_k(n)=W_K A_{k-1}(n)-B_{k-1}(n-D_K)$$

wherein $(A_0(n), B_0(n))$ is a predefined function of $(Ga_3, Gb_3, n)$,
wherein $Ga_3=[+1, +1, −1]$, and $Gb_3=[+1, +j, +1]$,
wherein Dk denotes a first vector, and Wk denotes a second vector.

8. The apparatus of claim 7, wherein $(A_0(n), B_0(n))$ is a first predefined function of $(Ga_3, Gb_3, n)$ for an odd index corresponding to the EDMG field, and wherein $(A_0(n), B_0(n))$ is a second predefined function of $(Ga_3, Gb_3, n)$ for an even index corresponding to the EDMG field, the second predefined function is different from the first predefined function.

9. The apparatus of claim 8, wherein the index comprises a stream number.

10. The apparatus of claim 7, wherein $(A_0(n), B_0(n))=(+Ga_3(2-n), +Gb_3(2-n))$ for an index 1, 3, 5, or 7 corresponding to the EDMG field.

11. The apparatus of claim 1, wherein the plurality of iterations comprises seven iterations of the recursive procedure.

12. The apparatus of claim 1, wherein the pair of Golay complementary sequences of length 384 is based on a space-time stream number corresponding to the EDMG field.

13. The apparatus of claim 1, wherein the pair of Golay complementary sequences of length 384 comprises a first Golay sequence comprising a first combination of the values −1, +1, −j and +j; and a second Golay sequence comprising a second combination of the values −1, +1, −j and +j.

14. The apparatus of claim 1, wherein the pair of Golay complementary sequences of length 384 comprises a first Golay sequence, denoted $Ga^1_{384}$, and a second Golay sequence, denoted $Gb^1_{384}$, wherein:

$Ga^1_{384}$={1 +1 −j +1 +1 +1 −1 −1 +j −1 −1 −1 +1 −1
+j −1 −1 −1 +1 −1 +j −1 −1 −1 +1 −1 +j −1 +1
+1 −1 −1 +j +1 +1 −1 −1 +j +1 −1 −1 +1
−1 +j −1 +1 +1 +1 −j +1 +1 +1 −1 −1 +j −1
−1 −1 +1 +1 −j +1 +1 +1 −1 +1 −j +1 +1 +1
−1 −1 +j −1 +1 +1 −1 −1 +j −1 +1 +1 −1 −1 +j
−1 +1 +1 −1 +1 −j +1 −1 −1 +1 −j −1 −1
−1 +1 +1 −j +1 +1 +1 −j +1 +1 +1 −1
+1 −j +1 +1 +1 −1 −1 +j +1 −1 −1 +1 −j +1
−1 −1 +1 −j +1 +1 +1 −1 −j +1 +1 +1 −1
+1 +1 −j +1 +1 +1 −1 +j −1 −1 −1 +1 +1 −j
+1 +1 +1 −1 −j +1 +1 +1 −1 +j −1 −1 −1 +1
+1 −1 −1 +j −1 +1 +1 −1 +j +1 +1 +1 −1
+1 −j +1 −1 −1 +1 −j +1 +1 +1 −1 +j −1
−1 −1 +1 −1 +j −1 −1 −1 +1 −j −1 −1 −1
+1 −1 +j −1 +1 +1 −1 +j +1 +1 +1 −1 −j +1
+1 −1 −1 +1 −1 +j −1 +1 +1 −1 +j +1 +1 +1
+1 −1 −1 +j −1 −1 −1 +1 −j +1 +1 +1 −1 +j −1
+1 +1 −1 −1 +j −1 +1 +1 −1 +j −1 −1 −1
+1 +1 −j +1 −1 −1 +1 +j −1 −1 −1 +1 −j
+1 −1 −1 +1 −1 +j −1 +1 +1 −1 −j +1 +1
+1 −1 −1 +j −1 −1 −1 +1 −j −1 −1 −1 +1
+1 −1 −1 +1 −1 +j −1 +1 +1 −1 −j +1 +1 +1
+1 −1 −1 +1 −1 +j −1 +1 +1 −1}, and $Gb_{1384}$={−1 +j −1 −1 −1 +1 +1 −j +1 +1 +1 −1 +1
−j +1 +1 +1 −1 +1 −j +1 +1 −1 +1 −j +1 −1
−1 +1 +1 −j +1 +1 −1 −1 +1 −j +1 +1 −1
+1 −j +1 −1 −1 −1 +j −1 −1 −1 +1 +1 −j +1
+1 +1 −1 +1 +j −1 −1 −1 +1 −j −1 −1 −1
+1 −j +1 −1 −1 +1 +1 −j +1 +1 +1 −1 −1 +j
+1 −1 −1 +1 −1 +j −1 +1 +1 −1 +1 −j +1
+1 +1 −1 −1 +j −1 −1 −1 +1 −1 +j −1 −1 −1
+1 −j +1 −1 −1 +1 +1 −j +1 +1 +1 −1 +j −1
+1 +1 −1 −j +1 +1 +1 −1 +1 −j +1 +1 +1 −1
−1 +j −1 −1 −1 +1 +1 −j +1 +1 +1 −1 −1 +j
−1 −1 −1 +1 +1 −j +1 +1 +1 −1 +1 −j +1 +1
+1 −1 +j −1 −1 −1 +1 +j −1 −1 −1 +1 +j −1
−1 +1 +1 −j +1 +1 +1 −1 −j +1 +1 +1 −1 +j −1
+1 −j +1 +1 +1 −1 +1 −j +1 +1 +1 −1 +j −1
−1 −1 +1 +1 −j +1 +1 +1 −1 −j +1 +1 +1 −1
+1 −j +1 +1 +1 −1 −1 +j −1 −1 −1 +1 +j −1
+1 +1 −1 −1 +j +1 +1 +1 −1 +j −1 −1 −1 +1
+1 −1 +1 −j +1 +1 +1 −1 +j −1 −1 −1 +1
+1 −j +1 +1 +1 −1 −1 +j −1 −1 −1 +1 +j −1
−1 −1 +1 +1 −j +1 +1 +1 −1 +1 −j +1 +1 +1
−1 −1 +j −1 −1 −1 +1 +1 −j +1 +1 +1 −1
+1 −j +1 +1 +1 −1 −j +1 +1 +1 −1 +1
−1 −1 +1 +j −1 +1 +1 −1 +1 −j +1 +1 +1
+1 −1 −1 +j +1 +1 −1 −1 +1 −j +1 −1 −1 +1

−1 +j −1 +1 +1 −1 −1 +j −1 −1 −1 +1 +1 −j +1
+1 +1 −1 −1 +j −1 −1 −1 +1 −1 +j −1 −1 −1
+1 +1 −j +1 −1 −1 +1 +1 −j +1 −1 −1 +1 +1 −j
+1 −1 −1 +1 −1 +j −1 +1 +1 −1}.

15. The apparatus of claim 1, wherein the EDMG field comprises an EDMG Channel Estimation Field (EDMG-CEF).

16. The apparatus of claim 1, wherein the EDMG field comprises a Training (TRN) field.

17. The apparatus of claim 1 configured to cause the EDMG STA to modulate the EDMG field according to a π/2 Binary Phase-shift keying (BPSK) modulation.

18. The apparatus of claim 1 configured to cause the EDMG STA to transmit the EDMG PPDU in an EDMG Single Carrier (SC) transmission.

19. The apparatus of claim 1 comprising a radio, the processor configured to cause the radio to transmit the EDMG PPDU.

20. The apparatus of claim 19 comprising one or more antennas connected to the radio, and another processor to execute instructions of an operating system.

21. A product comprising one or more tangible computer-readable non-transitory storage media comprising computer-executable instructions operable to, when executed by at least one processor, enable the at least one processor to cause an Enhanced Directional Multi-Gigabit (DMG) (EDMG) wireless communication station (STA) to:
generate a pair of Golay complementary sequences of length 384 by performing a plurality of iterations of a recursive procedure based on a complex Golay complementary pair of length 3;
generate an EDMG field of an EDMG Physical Layer (PHY) Protocol Data Unit (PPDU) based on the pair of Golay complementary sequences of length 384; and
transmit the EDMG PPDU over a channel bandwidth of 6.48 Gigahertz (GHz).

22. The product of claim 21, wherein the recursive procedure is based on a vector Wk, which is based on an index corresponding to the EDMG field.

23. The product of claim 21, wherein the instructions, when executed, cause the EDMG STA to generate the pair of Golay complementary sequences of length 384 comprising a first Golay sequence $Ga_{384}(n)=conj(A_7(383-n))$, and a second Golay sequence $Gb_{384}(n)=conj(B_7(383-n))$, by performing seven iterations according to the following recursive procedure:

$$A_k(n)=W_K A_{k-1}(n)+B_{k-1}(n-D_K)$$

$$B_k(n)=W_K A_{k-1}(n)-B_{k-1}(n-D_K)$$

wherein $(A_0(n), B_0(n))$ is a predefined function of $(Ga_3, Gb_3, n)$,
wherein $Ga_3=[+1, +1, -1]$, and $Gb_3=[+1, +j, +1]$,
wherein Dk denotes a first vector, and Wk denotes a second vector.

24. An apparatus comprising:
means for generating by an Enhanced Directional Multi-Gigabit (DMG) (EDMG) wireless communication station (STA) a pair of Golay complementary sequences of length 384 by performing a plurality of iterations of a recursive procedure based on a complex Golay complementary pair of length 3;
means for generating an EDMG field of an EDMG Physical Layer (PHY) Protocol Data Unit (PPDU) based on the pair of Golay complementary sequences of length 384; and
means for causing the EDMG STA to transmit the EDMG PPDU over a channel bandwidth of 6.48 Gigahertz (GHz).

25. The apparatus of claim 24 comprising means for generating the pair of Golay complementary sequences of length 384 comprising a first Golay sequence $Ga_{384}(n)=conj(A_7(383-n))$, and a second Golay sequence $Gb_{384}(n)=conj(B_7(383-n))$, by performing seven iterations according to the following recursive procedure:

$$A_k(n)=W_K A_{k-1}(n)+B_{k-1}(n-D_K)$$

$$B_k(n)=W_K A_{k-1}(n)-B_{k-1}(n-D_K)$$

wherein $(A_0(n), B_0(n))$ is a predefined function of $(Ga_3, Gb_3, n)$,
wherein $Ga_3=[+1, +1, -1]$, and $Gb_3=[+1, +j, +1]$,
wherein Dk denotes a first vector, and Wk denotes a second vector.

* * * * *